US011206722B2

(12) United States Patent
Majewski et al.

(10) Patent No.: US 11,206,722 B2
(45) Date of Patent: Dec. 21, 2021

(54) LIGHTING CONTROL CIRCUIT, LIGHTING INSTALLATION AND METHOD

(71) Applicant: TRESTOTO PTY LIMITED, New South Wales (AU)

(72) Inventors: Donat Majewski, New South Wales (AU); Shane Majewski, New South Wales (AU)

(73) Assignee: TRESTOTO PTY LIMITED, New South Wales (AU)

( * ) Notice: Subject to any disclaimer, the term of this patent is extended or adjusted under 35 U.S.C. 154(b) by 0 days.

(21) Appl. No.: 16/642,941

(22) PCT Filed: Aug. 28, 2018

(86) PCT No.: PCT/AU2018/050915
§ 371 (c)(1),
(2) Date: Feb. 28, 2020

(87) PCT Pub. No.: WO2019/040978
PCT Pub. Date: Mar. 7, 2019

(65) Prior Publication Data
US 2020/0292161 A1 Sep. 17, 2020

(30) Foreign Application Priority Data

Sep. 1, 2017 (AU) .................... 2017903526
Dec. 11, 2017 (AU) .................... 2017904960

(51) Int. Cl.
*H05B 45/37* (2020.01)
*H05B 45/345* (2020.01)
(Continued)

(52) U.S. Cl.
CPC ............ *H05B 45/37* (2020.01); *F21V 23/02* (2013.01); *H05B 45/345* (2020.01); *H05B 45/355* (2020.01)

(58) Field of Classification Search
CPC ....... F21V 23/02; H05B 45/37; H05B 45/345; H05B 45/355
See application file for complete search history.

(56) References Cited

U.S. PATENT DOCUMENTS

| 1,841,685 A | 1/1932 | Sola |
| 1,893,251 A | 1/1933 | Sola |

(Continued)

FOREIGN PATENT DOCUMENTS

| BR | 102015032288 A2 | 6/2017 |
| CN | 108200679 A | 6/2018 |

(Continued)

OTHER PUBLICATIONS

ADB Airfield Solutions, "CCF (Ferroresonant) L-828/L-829 Constant Current Regulator with Universal Regulator Controller (URC)" User Manual 96A0288, Rev. W., Jun. 8, 2011, pp. 1-80.

(Continued)

*Primary Examiner* — Alexander H Taningco
*Assistant Examiner* — Pedro C Fernandez
(74) *Attorney, Agent, or Firm* — Polsinelli PC

(57) ABSTRACT

The present invention discloses a lighting installation having an LED lamp (19), normally consisting of a series string of individual LED's (18), which is supplied by a rectifier (20, 200). A control circuit (23, 23 & C1) is interposed between the rectifier and the AC supply which powers the rectifier. Various circuits for filtering, power factor control, multi-phase operation and dimming, for example by phase switching, are disclosed. In particular, the control carried out by the control circuit takes place on the AC side of the rectifier. Also disclosed are the control circuit per se and a method of converting a High Intensity Discharge (HID) lamp installation into a Light Emitting Diode (LED) installation. The control circuit can take the form of an inductor, an inductor (Continued)

and series capacitor, a shunt inductor, a leakage reactance transformer, a constant current transformer, an autotransformer, an isolation transformer or a ferro-resonant transformer.

39 Claims, 27 Drawing Sheets

(51) Int. Cl.
*H05B 45/355* (2020.01)
*F21V 23/02* (2006.01)

(56) References Cited

U.S. PATENT DOCUMENTS

| | | | |
|---|---|---|---|
| 1,895,231 | A | 1/1933 | Pearson et al. |
| 2,085,060 | A | 6/1937 | Young |
| 2,095,294 | A | 10/1937 | Sola |
| 2,136,895 | A | 10/1937 | Sola |
| 2,143,745 | A | 1/1939 | Sola |
| 2,179,795 | A | 11/1939 | McCurtain |
| 2,183,228 | A | 12/1939 | Sola |
| 2,212,198 | A | 8/1940 | Sola |
| 2,236,039 | A | 3/1941 | Sola |
| 2,346,621 | A | 4/1944 | Sola |
| 2,470,460 | A | 5/1949 | Bird |
| 2,535,169 | A | 12/1950 | Sola |
| 2,694,163 | A | 11/1954 | Sola |
| 2,694,177 | A | 11/1954 | Sola |
| 2,753,513 | A | 7/1956 | Sola |
| 2,787,732 | A | 4/1957 | Kusko |
| 2,806,199 | A | 9/1957 | Sola |
| 2,858,479 | A | 10/1958 | Sola |
| 2,870,398 | A | 1/1959 | Sola |
| 2,996,656 | A | 8/1961 | Sola |
| 3,022,458 | A | 1/1962 | Sola |
| 3,054,939 | A | 9/1962 | Thompson |
| 3,059,143 | A | 10/1962 | Sola |
| 3,172,031 | A | 3/1965 | Sola |
| 3,205,425 | A | 9/1965 | Moyer |
| 3,239,750 | A | 3/1966 | Weber |
| 3,278,823 | A | 10/1966 | Ross |
| 3,293,537 | A | 12/1966 | Sola |
| 3,361,956 | A | 1/1968 | Sola |
| 3,435,330 | A | 3/1969 | Sola |
| 3,500,128 | A | 3/1970 | Liepins |
| 3,521,147 | A | 7/1970 | Ostreicher |
| 3,573,606 | A | 4/1971 | Hart et al. |
| 3,611,021 | A | 10/1971 | Wallace |
| 3,611,116 | A | 10/1971 | Balian et al. |
| 3,612,988 | A | 10/1971 | Wanlass |
| 3,771,068 | A | 11/1973 | Paget et al. |
| 3,772,565 | A | 11/1973 | Lenz et al. |
| 3,812,415 | A | 5/1974 | Van Gilder et al. |
| 3,843,918 | A | 10/1974 | Rhyne |
| 4,130,790 | A | 12/1978 | Heisey |
| 4,142,141 | A | 2/1979 | Hase |
| 4,213,076 | A | 7/1980 | Walz |
| 4,399,391 | A * | 8/1983 | Hammer ............... H05B 41/044 315/105 |
| 4,558,229 | A | 12/1985 | Massey et al. |
| 4,656,412 | A | 4/1987 | McLyman |
| 4,766,352 | A * | 8/1988 | Widmayer ......... H05B 41/2325 315/239 |
| 4,943,763 | A | 7/1990 | Bobry |
| 5,497,052 | A | 3/1996 | Buckley, II |
| 5,729,120 | A * | 3/1998 | Stich ....................... G05F 1/613 323/237 |
| 5,886,507 | A | 3/1999 | Janik |
| 5,939,838 | A | 8/1999 | Janik |
| 6,388,393 | B1 | 5/2002 | Illingworth |
| 6,426,610 | B1 | 7/2002 | Janik |
| 6,782,513 | B1 | 8/2004 | Janik |
| 6,860,628 | B2 * | 3/2005 | Robertson ............... F21V 23/02 362/555 |
| 9,497,811 | B2 | 11/2016 | Schijffelen et al. |
| 10,064,248 | B2 | 8/2018 | Janik et al. |
| 10,337,693 | B1 | 7/2019 | Gordin et al. |
| 2005/0030192 | A1 | 2/2005 | Weaver et al. |
| 2005/0122062 | A1 | 6/2005 | Hsu |
| 2006/0284569 | A1 | 12/2006 | Wey et al. |
| 2007/0228999 | A1 | 10/2007 | Kit |
| 2009/0159677 | A1 | 6/2009 | Yakimov et al. |
| 2010/0237802 | A1 | 9/2010 | Aso et al. |
| 2010/0270930 | A1 | 10/2010 | Hui |
| 2012/0146536 | A1 | 6/2012 | Mullen et al. |
| 2012/0194094 | A1 | 8/2012 | Hsin-Mao et al. |
| 2013/0200707 | A1 | 8/2013 | Hartmann et al. |
| 2013/0342121 | A1 | 12/2013 | Matsumoto |
| 2014/0077713 | A1 | 3/2014 | Otake et al. |
| 2014/0132164 | A1 * | 5/2014 | McBryde ............... H05B 45/39 315/187 |
| 2014/0268941 | A1 | 9/2014 | Stepps |
| 2014/0320148 | A1 * | 10/2014 | Sharma ............... G01R 31/088 324/511 |
| 2015/0091463 | A1 * | 4/2015 | Jin .......................... H05B 45/39 315/201 |
| 2015/0250033 | A1 | 9/2015 | Veldman et al. |
| 2015/0366013 | A1 * | 12/2015 | Shrotriya ............. H05B 47/185 315/294 |
| 2016/0066374 | A1 | 3/2016 | Shen et al. |
| 2016/0073459 | A1 * | 3/2016 | Yang .................. H05B 45/3725 315/200 R |
| 2016/0113083 | A1 * | 4/2016 | Lo .......................... H05B 45/10 315/186 |
| 2016/0150609 | A1 | 5/2016 | Seki et al. |
| 2017/0019960 | A1 | 1/2017 | Qu et al. |
| 2017/0105265 | A1 * | 4/2017 | Sadwick ............... H05B 45/60 |
| 2017/0265259 | A1 * | 9/2017 | Janik ...................... H05B 45/10 |
| 2017/0279367 | A1 | 9/2017 | Qiu et al. |
| 2018/0153009 | A1 * | 5/2018 | Xiong .................... H05B 45/50 |
| 2018/0343716 | A1 * | 11/2018 | Mao ....................... H05B 33/06 |
| 2018/0368225 | A1 * | 12/2018 | Chou ..................... H05B 45/39 |

FOREIGN PATENT DOCUMENTS

| | | |
|---|---|---|
| EP | 2 654 374 A1 | 10/2013 |
| WO | WO 02/23956 A2 | 3/2002 |
| WO | WO 2010/122403 A1 | 10/2010 |
| WO | WO 2016/179056 A1 | 11/2016 |

OTHER PUBLICATIONS

Eaton. "Instruction Manual—Pro Power Regulator, Small", FAA L-828 and L-829 Constant Current Regulator Series 82860PES and 82960PRS 4kW, 7.5kW, 10kW, 6.6 Amperes, Document 1207, Rev. A, Jan. 12, 2016, 73 pages.

Icao, "7.0 Constant Current Regulators", Part 5—Electrical Systems, Mar. 18, 2010, pp. 7-1 through 7-6.

Lin et al., "Design and Implementation of Ferroresonant Transformer for LED Driver Systems", IEEE Transaction on Industry Applications, vol. 53, No. 6, Nov./Dec. 2017, pp. 5978-5987.

Cardesin et al., "LED Permanent Emergency Lighting System Based on a Single Magnetic Component" IEEE Transactions on Power Electronics, vol. 24, No. 5, May 2009, pp. 5978-5987.

Alonso et al., "Analysis and Experiments on a Single-Inductor Half-Bridge LED Driver with Magnetic Control", IEEE Transactions on Power Electronics, vol. 32, No. 12, Dec. 2017, pp. 9179-9190.

Hui et al. "A Novel Passive Offline Light-Emitting Diode (LED) Driver with Long Life", IEEE Transactions on Power Electronics, vol. 25, No. 10, Oct. 2010, pp. 2665-2672.

Wang et al., "High-power led constant-current driver circuit design and efficiency analysis", 2011 Cross Strait Quad-Regional Radio Science and Wireless Technology Conference, pp. 705-710.

Chen et al., "A Dimmable Light-Emitting Diode (LED) Driver With Mag-Amp Postregulators for Multistring Applications", IEEE Transaction on Power Electronics, vol. 26, No. 6, Jun. 2011, pp. 1714-1722.

(56) References Cited

OTHER PUBLICATIONS

Hart et al., "The Derivation and Application of Design Equations for Ferroresonant Voltage Regulators and Regulated Rectifiers", IEEE Transactions on Magnetics, vol. Mag-7, No. 1, Mar. 1971, pp. 205-211.

Yuriy Zhilichev, "Models of Ferroresonant Transformers", IEEE Transactions on Power Delivery, vol. 29, No. 6, Dec. 2014, pp. 2631-2639.

Walk et al., "An Analytic and Computer Study of the Jump Phenomenon in Ferroresonant Regulators", IEEE Transactions on Magnetics, Sep. 1971, pp. 574-577.

Schieber et al., "A New Static Magnetic Constant-Current Transformer", Static Magnetic Constant-Current Transformer, Aug. 1965, pp. 691-699.

Erlicki et al., "Working Range and Design of Static Constant-Current Transformer", IEEE Transactions on Power Apparatus and Systems, PAS-87, No. 5, May 1968, pp. 1259-1626.

Tom S. Osterman, Improving Power Supply Efficiency, NCTA Technical Papers, 1987, pp. 48-53.

Dekker, "Chapter 11. Constant Voltage Transformer (CVT)", Miniature Valve Manufacturer, 2004, 20 pages.

Emag, "Constant Voltage and Constant Current Transformers—eMag Devices", Jun. 20, 2020, pp. 1-2.

IEEE Standard 449-1998 for Ferroresonant Voltage Regulators (R2007), Sep. 26, 2007.

\* cited by examiner

LIGHTING CONTROL CIRCUIT, LIGHTING INSTALLATION AND METHOD

CROSS REFERENCE TO RELATED APPLICATIONS

This application is a National Phase filing under 35 U.S.C. § 371 of PCT/AU2018/050915 filed on 28 Aug. 2018; and this application claims priority to Application No. 2017903526 filed in Australia on 1 Sep. 2017; and this application claims priority to Application No. 2017904960 filed in Australia on 11 Dec. 2017. The entire contents of each application are hereby incorporated by reference.

FIELD OF THE INVENTION

The present invention relates to lighting and, in particular, to outdoor lighting such as street lighting or stadium lighting. The present invention also relates to indoor lighting (such as highbays). Hitherto such lighting has been supplied by means of High Intensity Discharge (HID) lamps.

BACKGROUND ART

HID lamps are essentially AC devices and have a negative resistance characteristic. As a consequence, power is supplied by an AC mains supply and a ballast or choke is connected in series with the lamp so as to prevent damage to the lamp from excessive currents. A typical HID lamp such as a 1000 W Metal Halide has an ignition voltage of 750 V peak, an operating voltage of 260V and an operating current of 4 A giving a lamp power of approximately 1000 W and a light output of 100,000 Lumens.

In recent years lamps having one or more light emitting diodes (LEDs) have replaced filament lamps and low intensity discharge lamps such as fluorescent lamps. As the power capability of such LEDs has increased, so LEDs have come to be used in outdoor lighting such as street lighting and stadium lighting where considerable powers (for example in excess of 1 kW) are required.

Clearly, as the word "diode" implies, LEDs are DC (or unidirectional current) devices. In addition, a LED has a positive resistance characteristic (in which the resistance varies with the current flowing through the LED). As DC devices, where LEDs are supplied from the AC mains, there is normally a rectifier of some description supplied by the mains and the LEDs (together with their drivers or control circuits) are powered by the output of the rectifier. As a consequence, the DC control circuits for LED lamps are completely different from the AC control circuits for HID lamps.

One example of a high powered LED has a nominal voltage of 6V and draws a nominal current of 2.1 A. However, the LED can have a current of up to 4.8 A. A LED lamp fixture may typically include 24 such LEDs connected in series. Such a LED lamp fixture has an operating voltage of 150V and a nominal operating current of 2.1 A giving a lamp power of approximately 315 W and a light output of 30,000 Lumens. In some cases matched LEDs are connected in parallel, in which case the total current is shared.

Another example of a high powered LED has 36 LEDs in one string, has a nominal voltage of 225V, a nominal current of 2.1 A, a nominal wattage of 475 W and a light output of 45,000 Lumens.

Normally a control circuit in the form of an electronic driver of some kind (either a constant current circuit and/or a constant voltage circuit) is required to maintain the LED current within its rated limits. This control circuit is connected between the rectifier and the LEDs and in its simplest form comprises a single resistor. In addition, the output of the rectifier may have an unacceptable ripple and therefore a filter including one or more capacitors can be connected between the rectifier and the LED.

Where some further control function, such as dimming, is required then this is carried out by a control circuit connected between the rectifier and the LEDs. For example, pulse width modulation (PWM) is often used to control the brightness of LEDs. Thus a control circuit in the form of a PWM modulator is connected between the rectifier and the LEDs.

A particular problem with the above-mentioned prior art is that the drivers or control circuits normally include one or more electrolytic capacitors having high levels of capacitance. This has the consequence of very high initial transient currents at starting since the capacitor(s) require large amounts of charge in order to reach their operating voltage. Prior art novelty searches carried out after the conception of the present invention have disclosed U.S. Pat. No. 9,497,811 (Schijffelen) which is illustrative of this prior art. All control is carried out between the rectifier and the string of LEDs.

In addition, high voltage semiconductors are very expensive. Consequently designers are often forced for economic reasons to use multiple driver systems incorporating lower voltage and less expensive semiconductors. Multiple driver systems mean more control wires and more complexity with an increased chance of circuit failure in service.

GENESIS OF THE INVENTION

The Genesis of the present invention is a desire to avoid such problems by adopting an alternative control arrangement for LED lamps.

SUMMARY OF THE INVENTION

In accordance with a first aspect of the present invention there is disclosed a control circuit for an LED lamp unit, said circuit comprising AC inputs for connection to an AC mains supply, a pair of lamp outputs for connection to said LED lamp unit, and a rectifying circuit supplied from said AC inputs and supplying said lamp outputs, wherein a control circuit is interposed between said AC inputs and said rectifying circuit.

In accordance with a second aspect of the present invention there is disclosed a lighting installation comprising a LED lamp fixture supplied by a rectifier, said rectifier being supplied by an AC mains supply, and a control circuit interposed between said rectifier and said AC mains supply.

According to another aspect of the present invention there is provided a method of converting a High Intensity Discharge (HID) lamp installation supplied by an AC mains supply and including an HID lamp fitting, a ballast and associated control gear, to an LED lamp installation including a LED lamp fitting and supplied by said supply, said method comprising the steps of:

replacing said HID lamp fitting with said LED lamp fitting, replacing said ballast and associated control gear with a rectifier having an input and an output, connecting the output of said rectifier to said LED lamp fitting, and interposing a control circuit between said AC mains supply and said rectifier input.

A particular advantage of the above method is that it enables the use of existing cabling and control gear housings that were previously used for the HID installation resulting in a simple and cost effective conversion process.

Various forms of control circuit are disclosed as are variants of the above where the AC mains supply is a three-phase supply.

BRIEF DESCRIPTION OF THE DRAWINGS

Preferred embodiments of the invention will now be described, by way of example only, with reference to the accompanying drawings in which.

DETAILED DESCRIPTION

Figure 1:
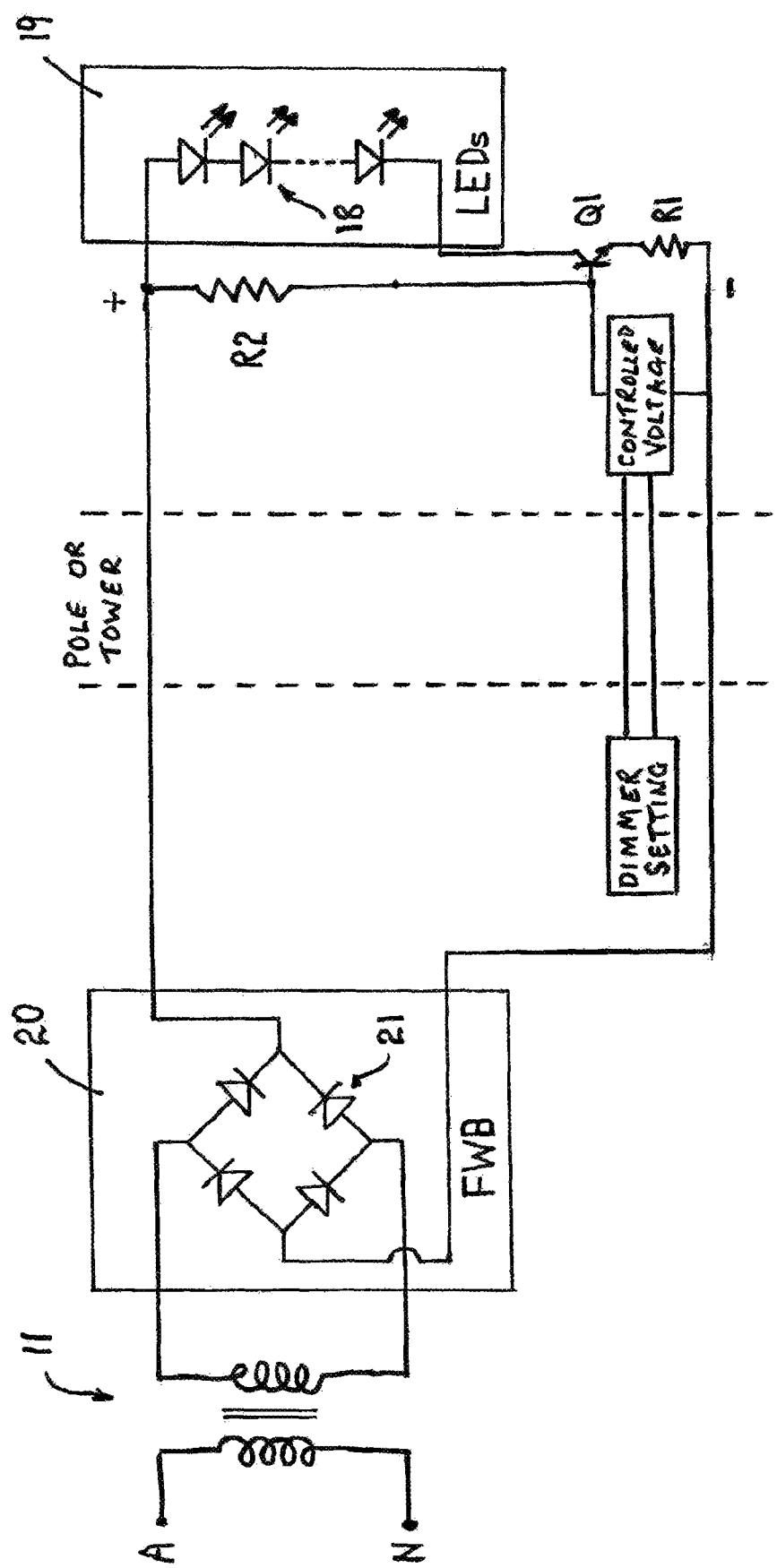
FIG. 1 is a prior art circuit showing an electronic driver for an LED lamp.

As seen in FIG. 1, a prior art LED lamp circuit takes the form of a transformer 11 supplied by an AC mains supply, and a full wave bridge rectifier 20 which supplies the necessary DC voltage. The rectifier 20 includes four regular diodes 21. The LED lamp 19 takes the form of a string of light emitting diodes 18.

In order to control the lamp current with fluctuations in mains voltage, a control circuit in the form of resistors R1 and R2, a transistor Q1 and a controlled voltage, is provided. The controlled voltage where no dimming is required can take the form of a reverse biased Zener diode. The controlled voltage is equal to the base-emitter voltage of the transistor Q1 and the voltage across the resistor R1. Since the base emitter voltage does not vary in any significant fashion with the collector-emitter current flowing through the transistor, this means that the voltage across the resistor R1 is substantially constant. This in turn renders the current through the lamp 19 substantially constant.

Where the lamp 19 is to be dimmed, the controlled voltage itself is adjustable by a further dimmer setting circuit which enables the controlled voltage to be adjusted. As a consequence, the lamp 19 and its associated circuitry which are positioned at the top of a pole or tower, are connected to the remainder of the circuit by four wires.

Figure 2:
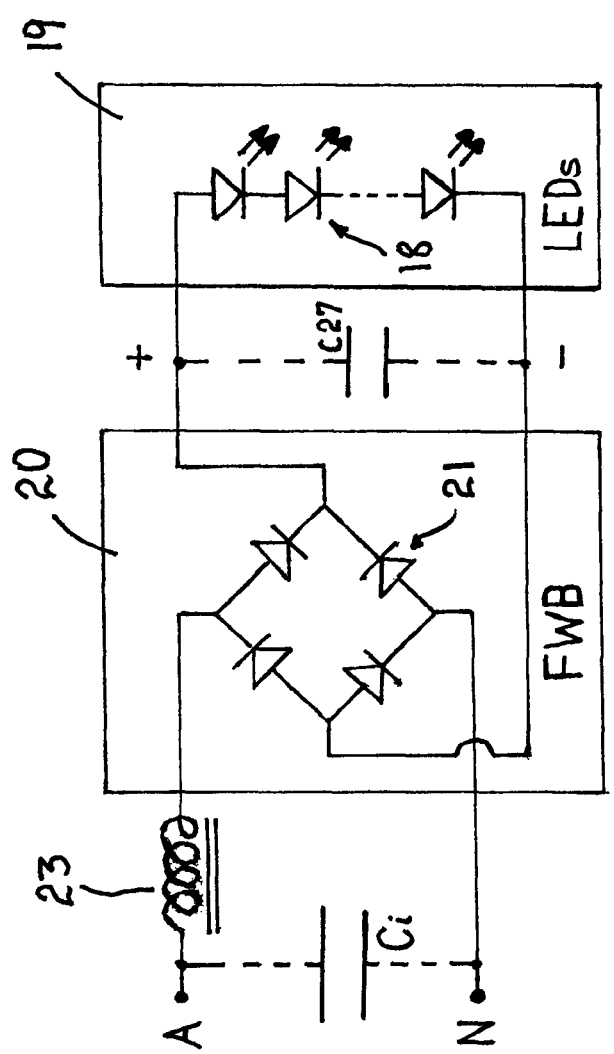
FIG. 2 is circuit diagram for operation of a LED lamp utilising a single inductor control circuit of a first embodiment and an optional filter capacitor and optional power factor correction capacitor.

Turning now to FIG. 2, the lamp 19 is as before consisting of a sequence of series connected light emitting diodes 18. The lamp 19 is directly connected to a full wave bridge (FWB) rectifier 20 composed of four regular diodes 21 connected in the traditional manner for a full wave rectification. The rectifier 20 is supplied by an AC mains supply having an active terminal A and a neutral terminal N. An iron cored inductor 23 is interposed between the mains supply and the rectifier 20, preferably in the active lead as illustrated. The inductor 23 operates as a control circuit. The current supplied by the bridge rectifier 20 to the LED lamp 19 is maintained within the upper and lower limits of LED current conduction by the impedance of the inductor 23.

In addition, the inductor 23 provides a phase shift in the mains current so that the mains current is continuous and essentially sinusoidal in shape. Two capacitors Ci and C27 are drawn in FIG. 2 in broken lines in order to indicate that they are optional and can be provided if desired. The function of capacitor C27 is to smooth out the ripple voltage provided by the Full Wave Bridge rectifier 20. The function of the capacitor Ci is to improve the power factor of the mains current.

It will be seen that, there are only two wires required to supply the LED lamp 19. As a consequence, the lamp 19 can be located at the top of a tower or pole (not illustrated) and the operating circuitry in the form of the inductor 23 and rectifier 20 can be located at the base of the tower or pole. This enables an easy retrofit in order to replace existing HID lighting installations.

Figure 3:
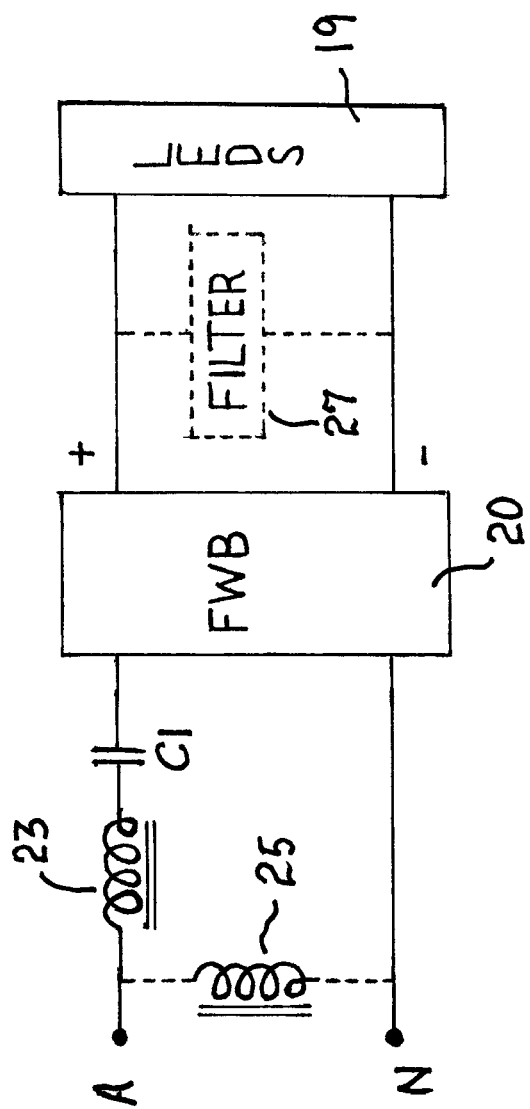
FIG. 3 is a modification to the circuit diagram of FIG. 2 to improve its current control.

Turning now to FIG. 3, in this embodiment the full wave bridge rectifier 20 and LED lamp 19 and inductor 23 are as before, however, a capacitor C1 is added in series with the inductor 23 to convert the lagging low power factor circuit of FIG. 2 (without capacitor Ci) into a leading low power factor circuit. The inclusion of the capacitor C1 also reduces the variation in the current supplied to the LEDs 19 due to mains voltage variations. Further reductions in current variation due to mains voltage variations can be achieved by introducing a degree of non-linearity into the inductor 23.

Alternatively, or additionally, if desired an optional shunt inductor 25 (illustrated by broken lines in FIG. 3) can be connected across the mains terminals to improve the power factor. A further optional addition is the connection of a filter 27 across the output of the rectifier 20. The provision of the filter 27 attenuates the ripple in the the current through the LEDs 19.

Figure 4:
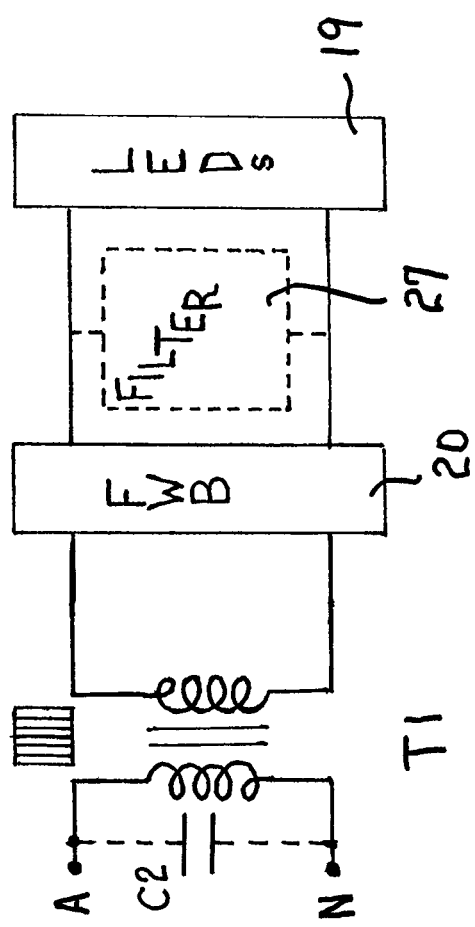
FIG. 4 is a circuit diagram of a third embodiment incorporating a high leakage reactance transformer.

In the embodiment of FIG. 4, an isolated leakage reactance transformer T1 incorporating magnetic shunts, is connected across the mains and thus substitutes for the inductor 23. The bridge rectifier 20 and LED lamp 19 are as before. The optional filter 27 is also as before. An optional capacitor C2 can be connected across the mains terminals to improve the power factor. The high leakage reactance of the transformer T1 provides essentially the same phase shift in the output current as provided by the inductor 23 of FIG. 2. As a result, there is a continuous and essentially sinusoidal current flow in both the primary and secondary windings of the isolated leakage reactance transformer T1.

Figure 5:
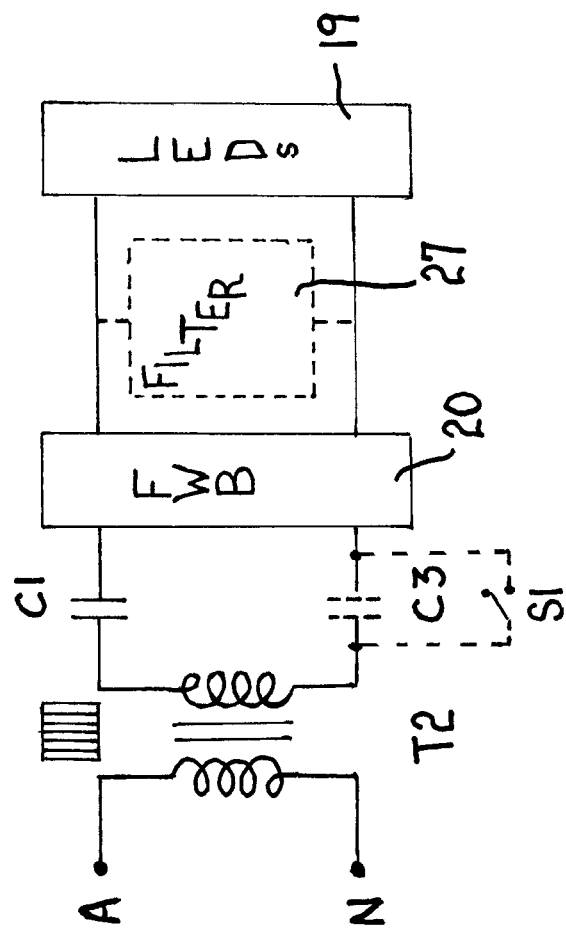
FIG. 5 is a circuit diagram of a fourth embodiment incorporating an isolated constant current transformer.

A variation of the circuit of FIG. 4 is illustrated in FIG. 5. An isolated leakage reactance transformer T2 of FIG. 5 has a capacitor C1 connected in series with its secondary winding. Preferably the magnetic circuit associated with the secondary winding is modified so as to permit partial saturation. This non-linear nature of the secondary winding inductance in conjunction with the capacitor C1, results in a relatively constant current through the LEDs 19 irrespective of variations in the mains supply voltage.

The inclusion of an optional capacitor C3 (illustrated in broken lines in FIG. 5) in series with the capacitor C1 and the secondary winding of the transformer T2, increases the capacitive reactance in the output circuit of the transformer T2. This therefore reduces the current through the LEDs 19 and dims the light output. Closing the optional switch S1 restores the full light output.

An alternative technique to achieve dimming is to substitute parallel capacitors for the capacitor C1. Full light output is achieved when both capacitors are in circuit but a dimmed light output is achieved when one of the two parallel capacitors is switched out of the circuit. More than one dimming level of light output can be achieved by using various combinations of series and/or parallel switched capacitors.

Figure 6:
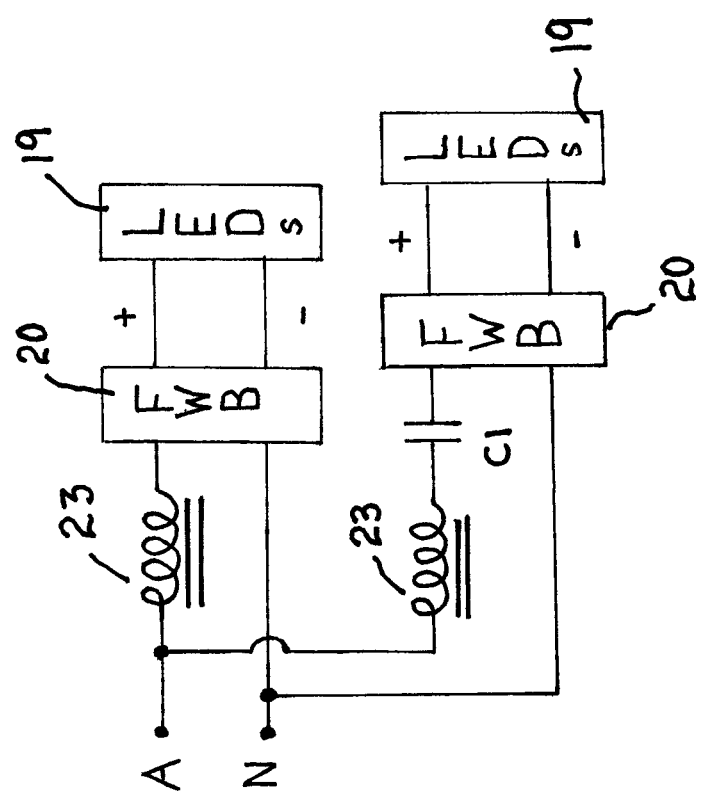
FIG. 6 is a circuit diagram of a fifth embodiment being a combination of the circuits of FIGS. 2 and 3.

In FIG. 6, the circuits of FIGS. 2 and 3 are combined to produce a high power factor circuit which can operate two lamps 19 in a lead-lag configuration. This is very beneficial for the mains supply network.

Figure 7:
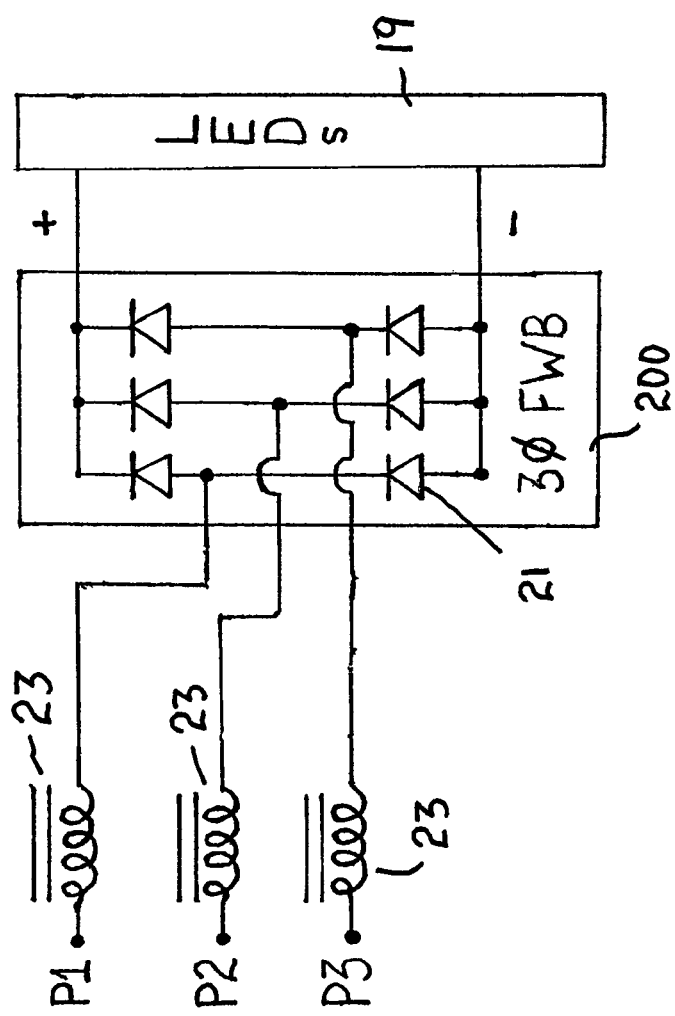
FIG. 7 is a three-phase circuit diagram of a sixth embodiment.

In order to achieve low ripple current through the LEDs 19 without the need for a filter 27 or filter capacitor C27 as shown in FIG. 2 and FIG. 3, three-phase mains power inputs can be used. FIG. 7 illustrates a simple three-phase embodiment of the circuit of FIG. 2. A conventional three-phase full wave bridge rectifier 200 utilising six regular diodes 21 replaces the rectifier 20 of FIG. 2. An inductor 23 is provided for each of the 3 phases P1-P3.

Figure 8:
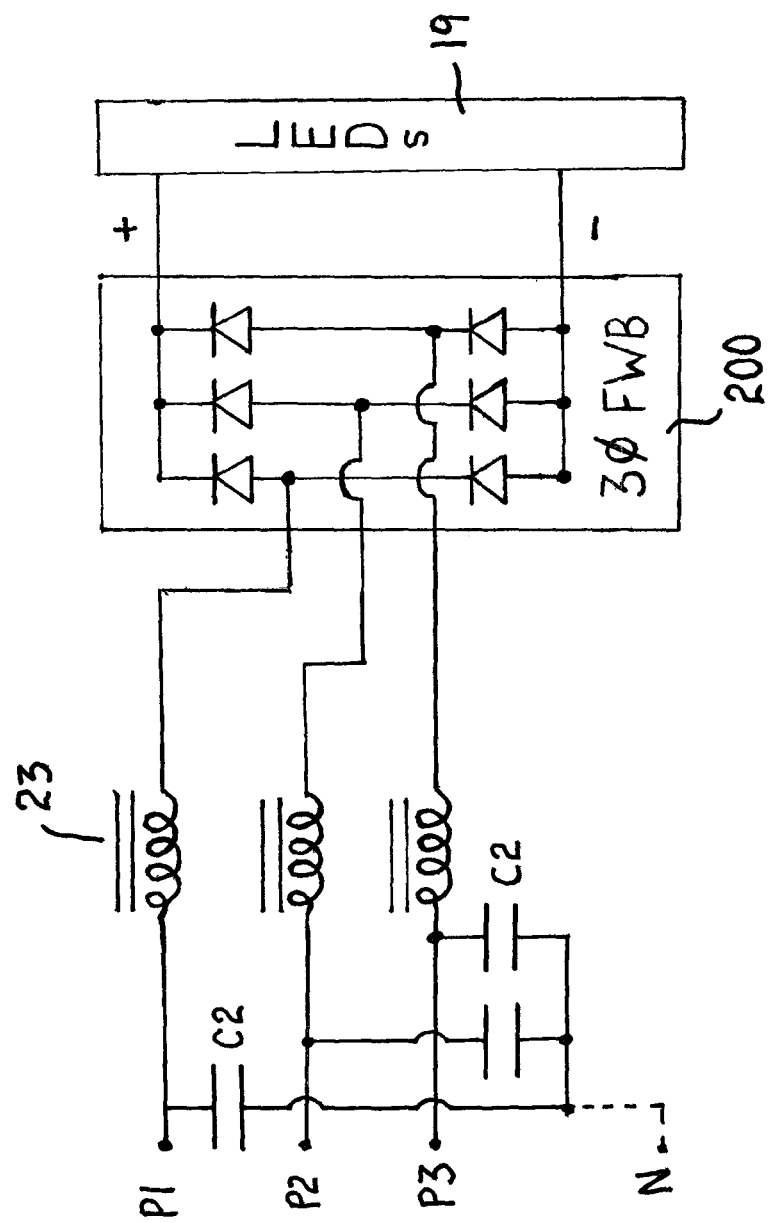
FIG. 8 is a modification of the circuit diagram of FIG. 7.

FIG. 8 illustrates a modification of the circuit diagram of FIG. 7 in that an input shunt capacitor C2 is added for each phase. This improves the power factor of the circuit of FIG. 7. The shunt capacitors C2 can be connected in Wye configuration to an optional Neutral terminal N as shown which results in a 4 wire supply. Alternatively, in a 3 wire supply arrangement, the shunt capacitors can be connected in Wye configuration to a floating star point. Alternatively, a Delta connection between the phases can be used for these power factor correcting capacitors C2, thereby again resulting in a 3 wire supply.

Figure 9:
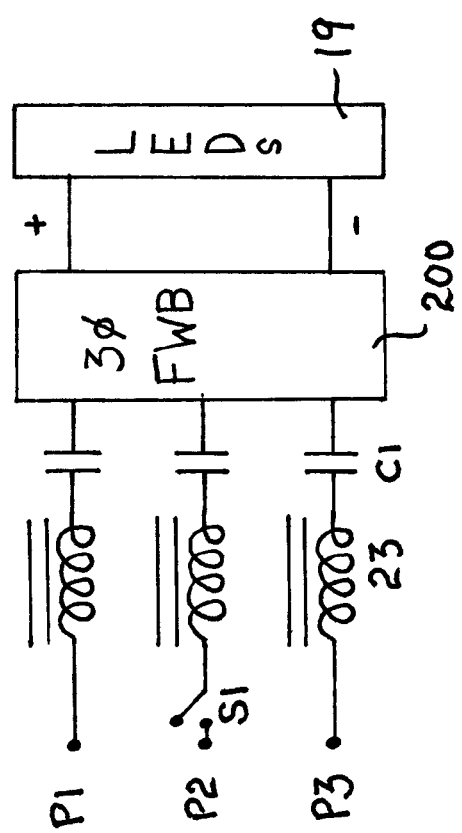
FIG. 9 is a circuit diagram of a seventh embodiment incorporating a dimming function.

FIG. 9 illustrates a further embodiment in which the three-phase circuit of FIG. 7 is modified by the provision of a switch S1 which enables a single phase to be turned off. This has the consequence of dropping the current supplied via the three-phase rectifier 200 to the LED lamp 19. The reduced current through the lamp 19 is, however, still within the specified current range of the lamp 19 but results in the lamp being dimmed. Such dimming is particularly useful in introducing lighting at sporting fixtures during the onset of evening. In addition to a saving in power, the eyes of the spectators and players are allowed to adjust to the artificial lighting environment. Alternatively, such dimming is an acceptable lower lighting level for training activities, as opposed to match competition. The identical dimming function is also available by switching power off to one of the phases of the circuits of FIGS. 7 and 8. In the particular embodiment of FIG. 9, a series capacitor C1 is provided for each phase.

Figure 10:
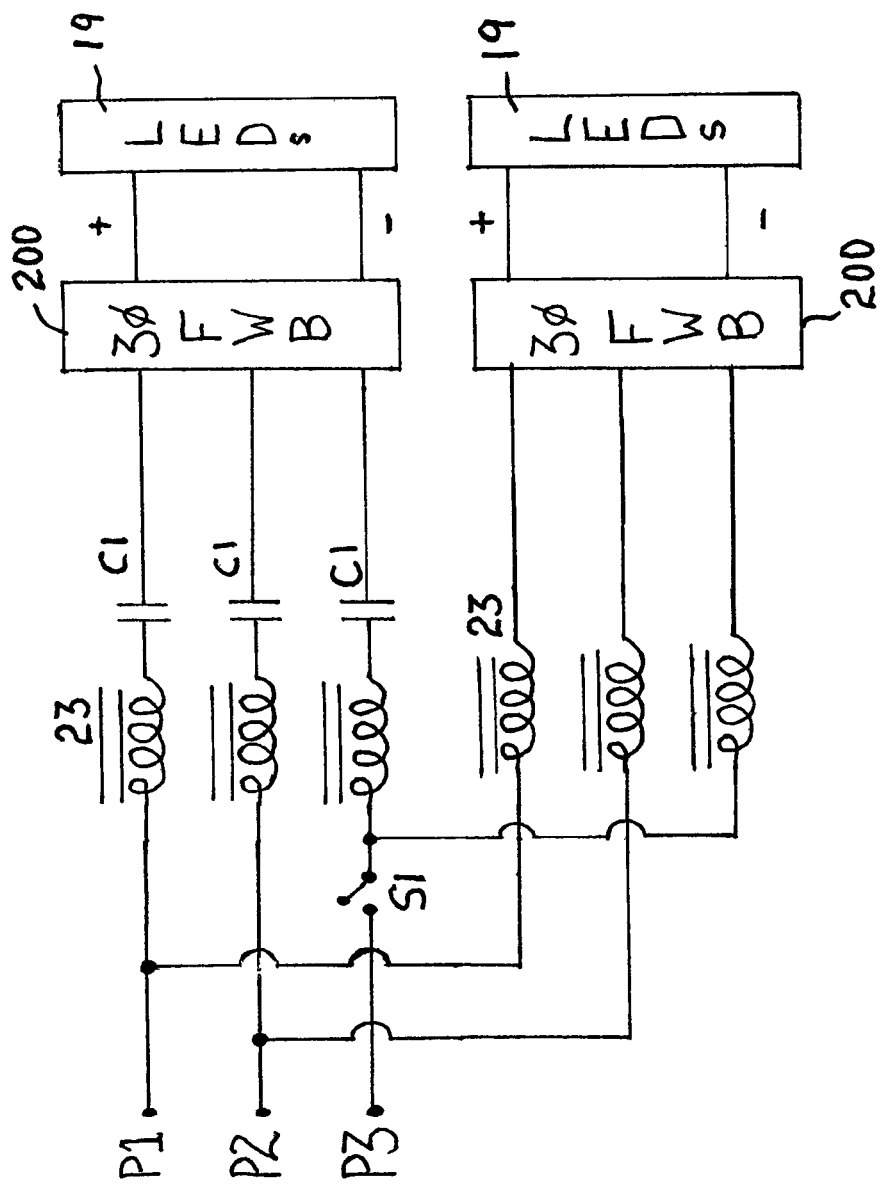
FIG. 10 is a combination of the circuits of FIGS. 7 and 9

In a manner analogous to FIG. 6, FIG. 10 is a combination of the circuits of FIGS. 7 and 9 which permits two LED lamps 19 to be operated in a high power factor lead-lag arrangement. The switch S1 enables one of the phases to be dropped to dim both lamps 19.

Figure 11:
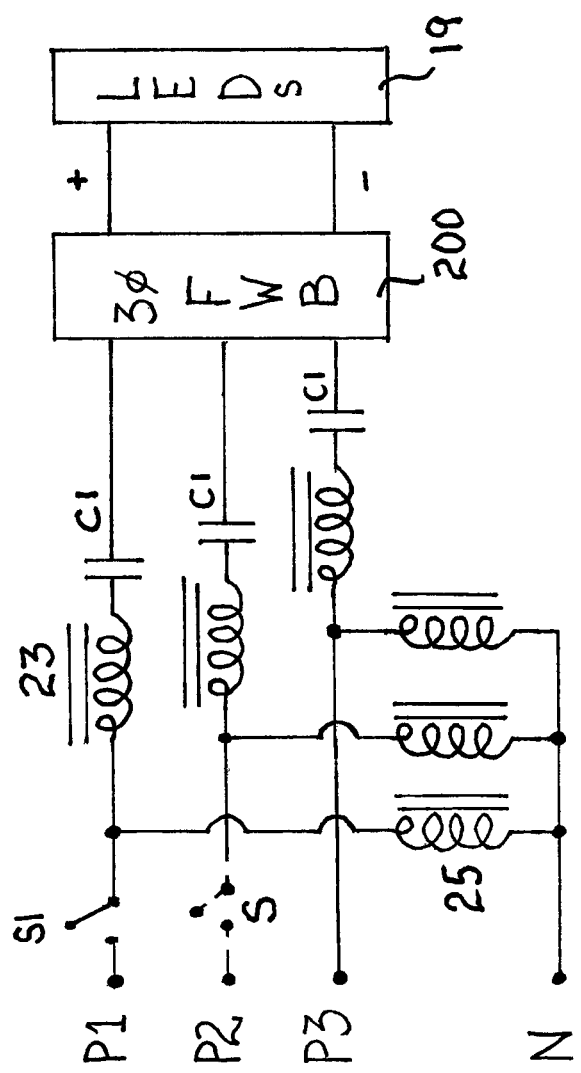
FIG. 11 is a circuit diagram of a ninth embodiment being a three-phase version of the circuit of FIG. 3.

Similarly, FIG. 11 represents a three-phase version of the circuit of FIG. 3 utilising shunt inductors 25, one for each phase. The switch S1 can be open to provide a first level of dimming of the LEDs 19. If desired, an optional second switch S2 (illustrated in broken lines in FIG. 11) can be provided in another phase. If both switches S1 and S2 are opened, a second lower dimming level can be achieved (provided the available voltage is adequate to provide the LEDs forward voltage drop and drive sufficient current through the LEDs).

Figure 12:
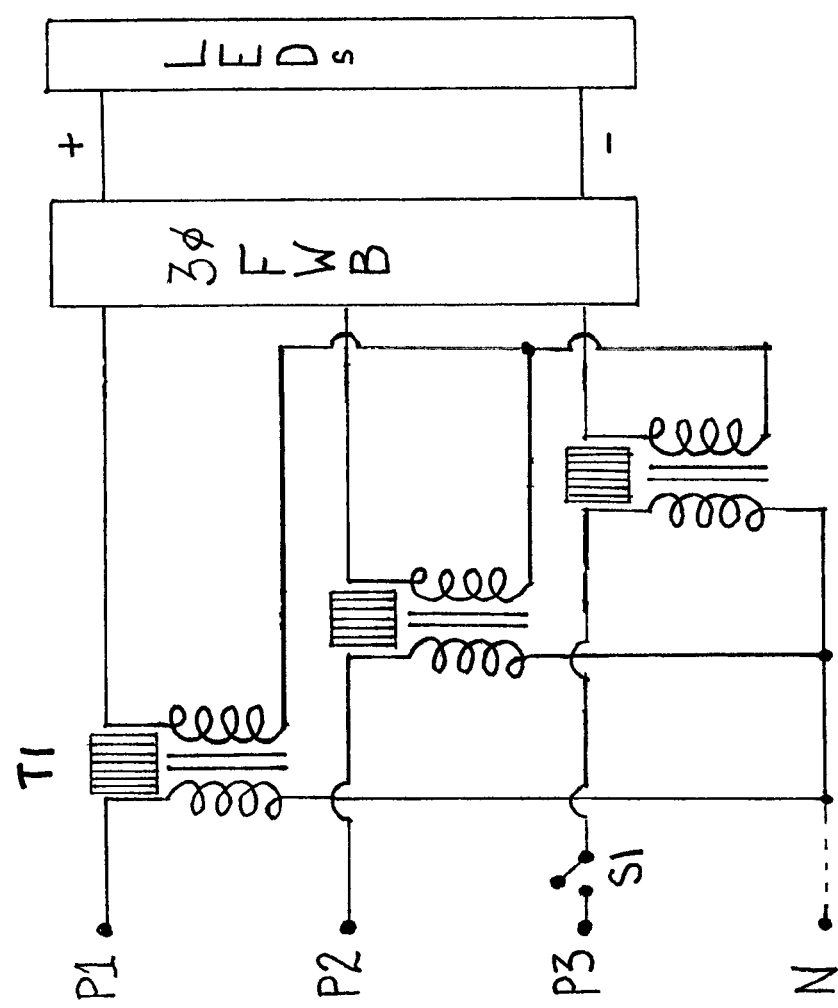
FIG. 12 is a circuit diagram of a tenth embodiment being a three-phase version of the circuit of FIG. 4.

Similarly, FIG. 12 represents a three-phase version of the circuit of FIG. 4 utilising three isolated leakage reactance transformers T1, again one for each phase. Again the switch S1 enables a dimming function to be achieved. The three primary windings are connected in star or Wye configuration and preferably the star point is floating so as to form a 3 wire supply. Alternatively, the star point can be connected to a mains neutral terminal N so as to form a 4 wire supply. As for FIG. 8, power factor correction capacitors C2 can be connected to the power supply terminals in either Delta or star configurations.

Figure 13:
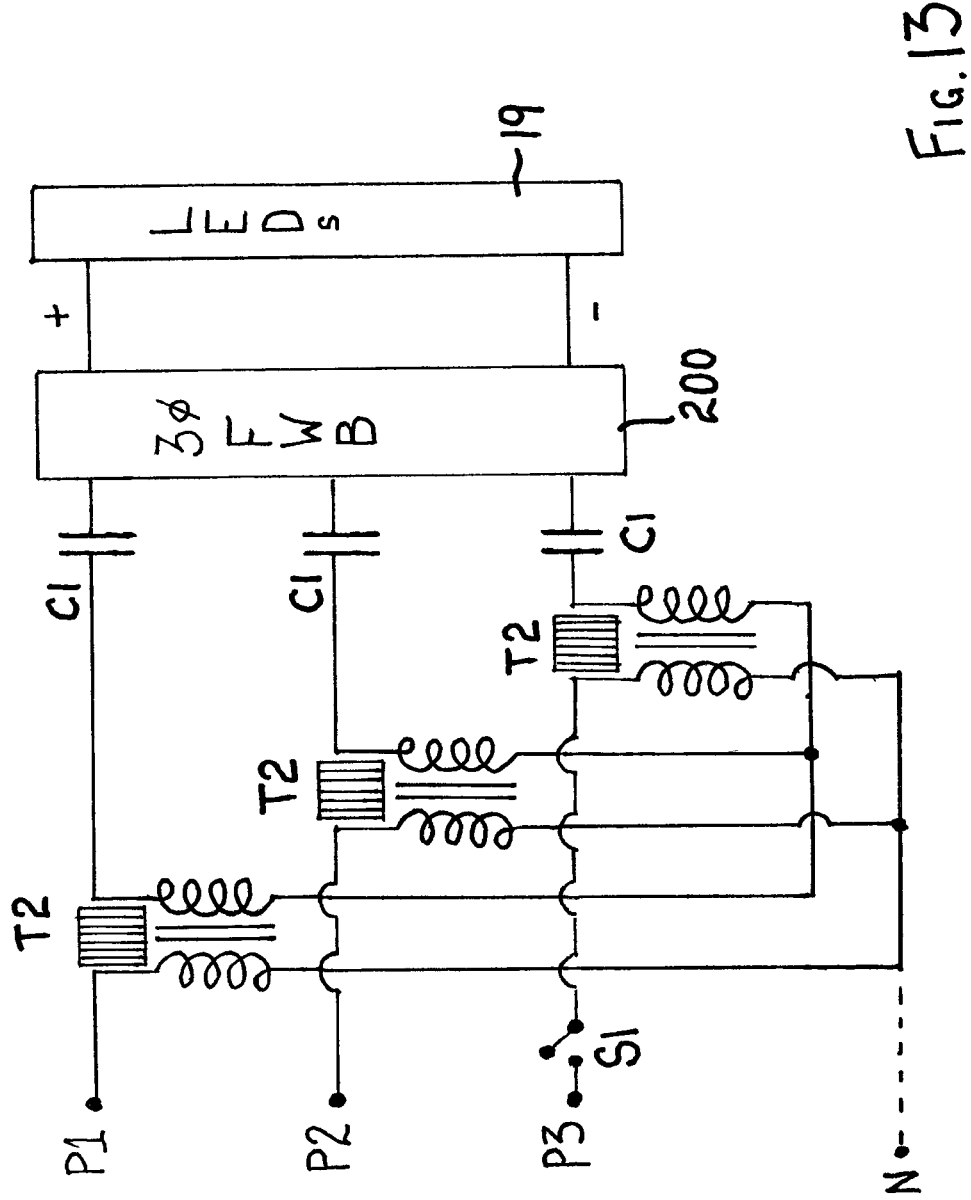
FIG. 13 is a circuit diagram of another three phase embodiment.

Still further, FIG. 13 represents a three-phase version of the circuit of FIG. 5 utilising three isolated constant current transformers T2, again one for each phase. A series capacitor C1 is provided for each phase.

Figure 14:
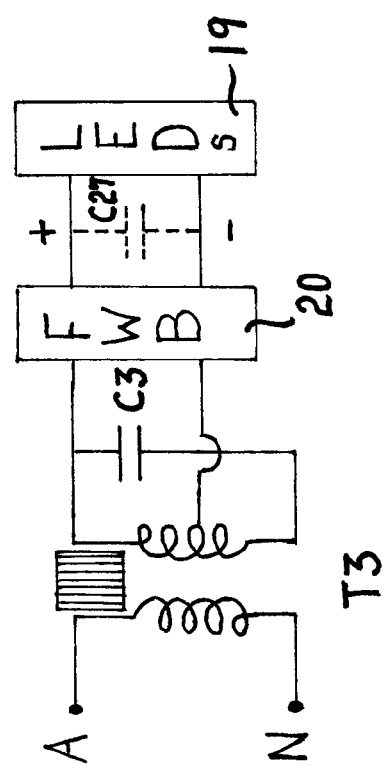
FIG. 14 is a circuit diagram of an eleventh embodiment incorporating a ferro-regulator in the control circuit.

Turning now to FIG. 14, in a single phase circuit a ferro-regulating transformer T3 has a capacitor C3 connected across its secondary winding to form a tank circuit. The secondary winding is tapped to provide the appropriate input voltage to the full wave bridge rectifier 20. The lamp 19 is as before. If desired, an optional filtering capacitor C27 can be connected across the output of the rectifier 20.

Figure 15:
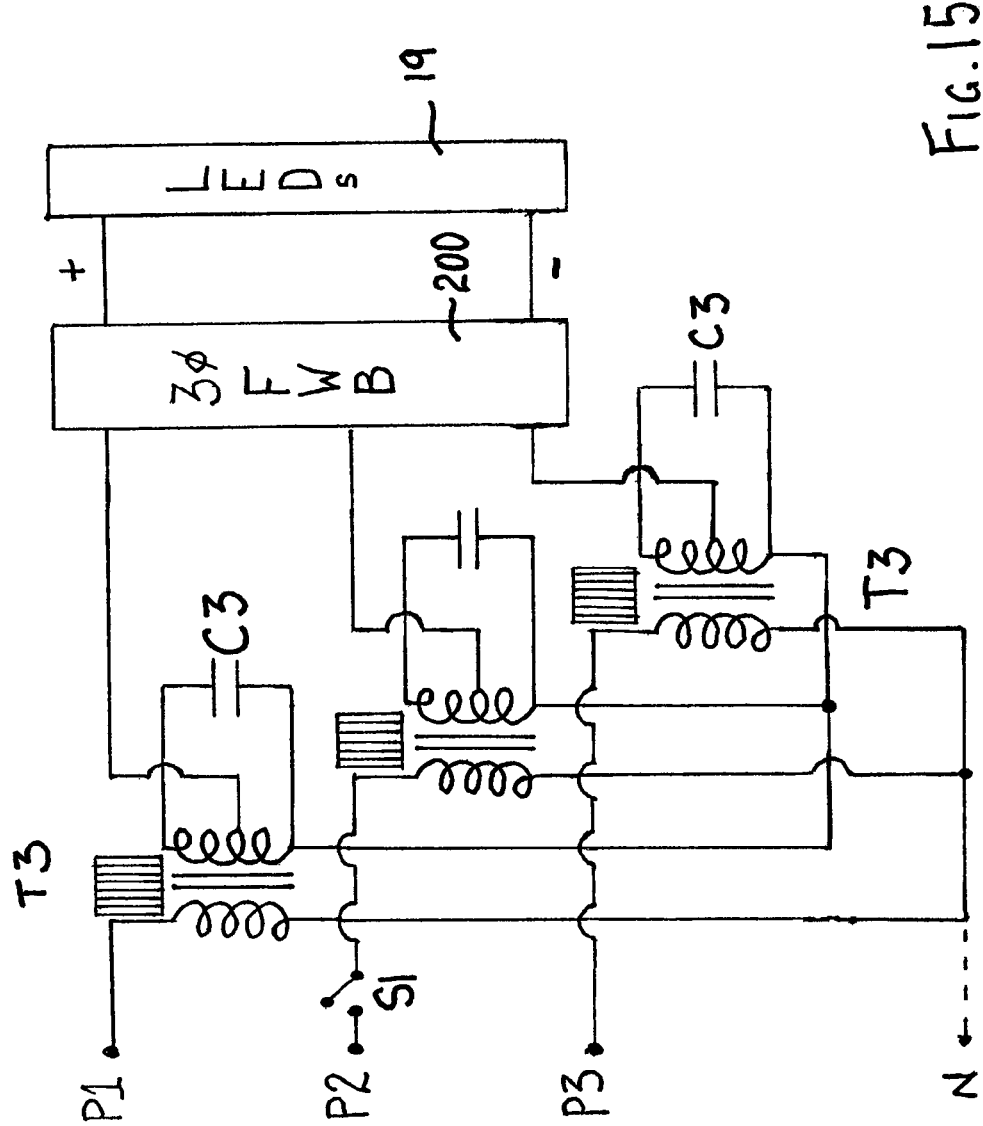
FIG. 15 is a circuit diagram of a twelfth embodiment being a three-phase modification of the circuit of FIG. 14.

FIG. 15 illustrates a three-phase version of the circuit of FIG. 14 utilising three ferro-regulating transformers T3. The three primary windings are connected in star or Wye configuration and preferably the star point is floating so as to form a 3 wire supply. Alternatively, the star point can be connected to a mains neutral terminal N so as to form a 4 wire supply.

Figure 16:
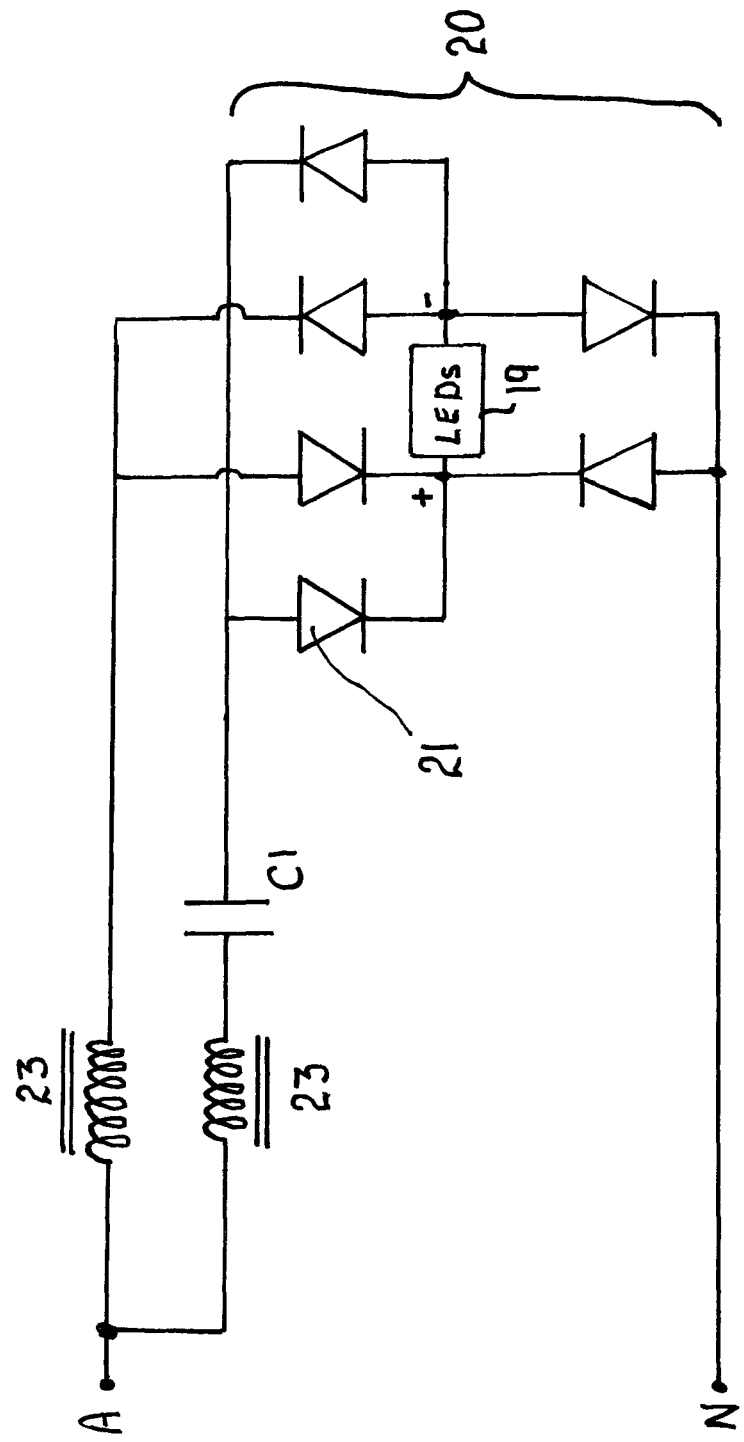
FIG. 16 is a circuit diagram of a further embodiment being a single phase dual rectifier circuit.

FIG. 16 illustrates a further single phase embodiment which is a similar to FIG. 6. Six diodes 21 constitute a double full wave bridge rectifier 20 which is fed via an inductor 23 on the one hand and a series connected inductor 23 and capacitor C1 on the other hand. As a consequence, both leading and lagging currents are supplied to the LEDs 19 simultaneously. The resultant LED current has very little ripple (approximately 5%) without any filter capacitor. In addition, the circuit has a very high power factor (almost unity) and low total harmonic distortion of the mains current.

Figure 17:
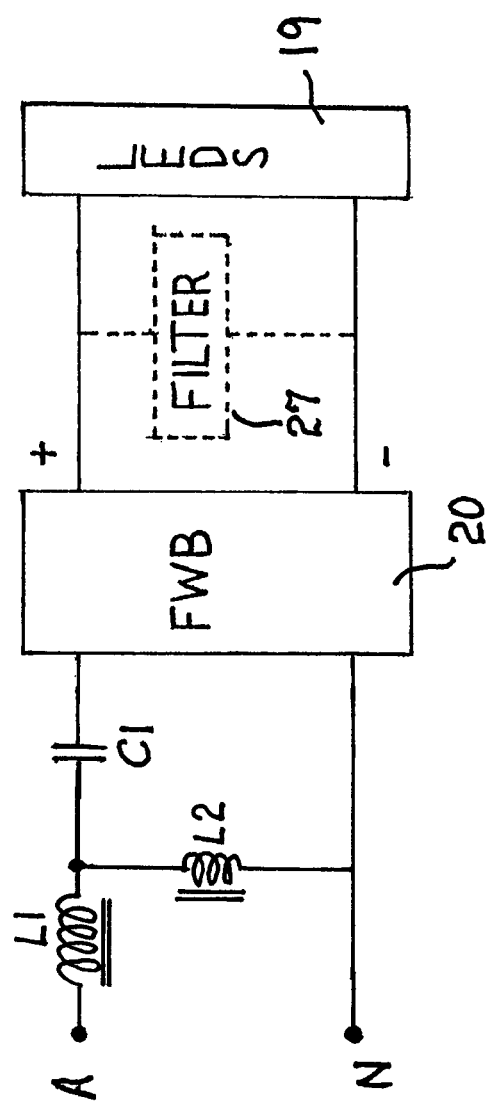
FIG. 17 is a still further single phase circuit with shunt saturatable inductor.

Turning now to FIG. 17, in this single phase circuit inductor L1 is a relatively linear inductor whereas inductor L2 has at least partial saturation of its core, so that the voltage across inductor L2 remains relatively constant. As a consequence, there is a substantially constant current flowing through capacitor C1 and hence a constant current flowing through the LEDs 19 notwithstanding fluctuations in the mains supply voltage.

Figure 18:
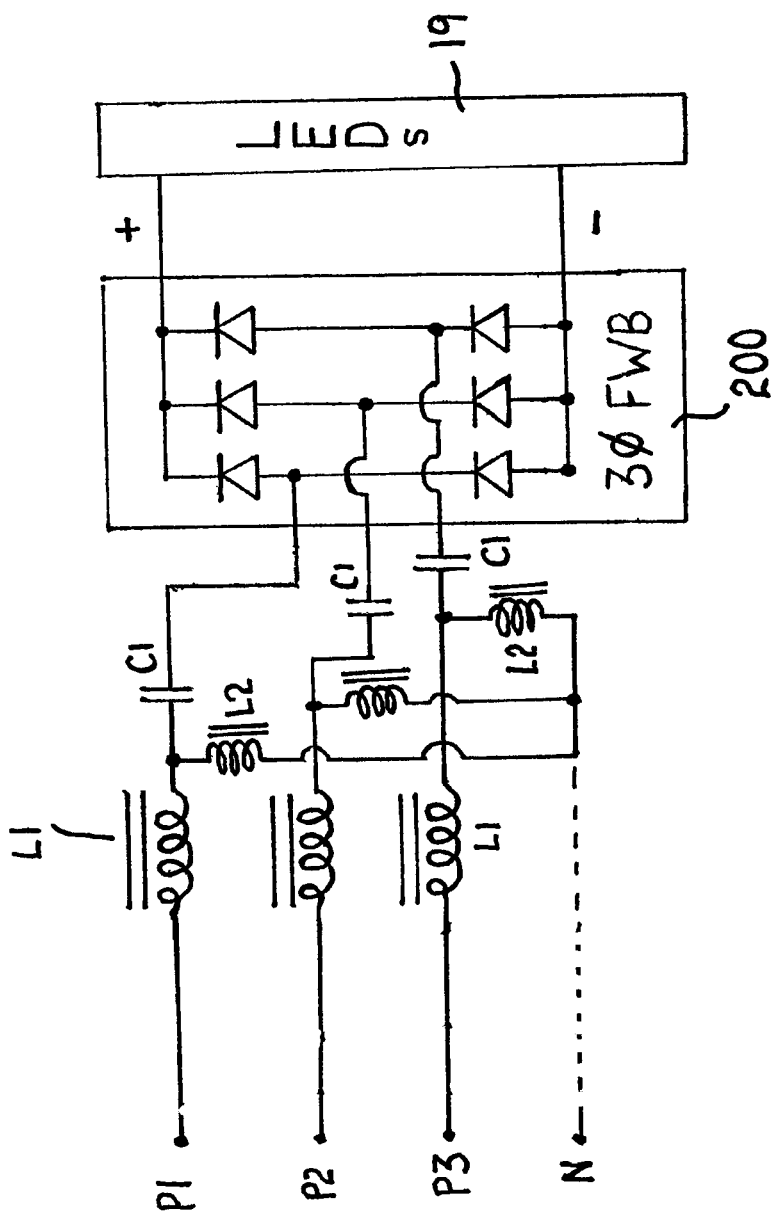
FIG. 18 is a circuit diagram of another embodiment being a three-phase modification of the circuit of FIG. 17

FIG. 18 illustrates a three-phase version of FIG. 17. The common connection point of inductors L2 can be either a floating star point with a 3 wire mains supply or can be connected to a neutral terminal N of a 4 wire mains supply.

Figure 19:
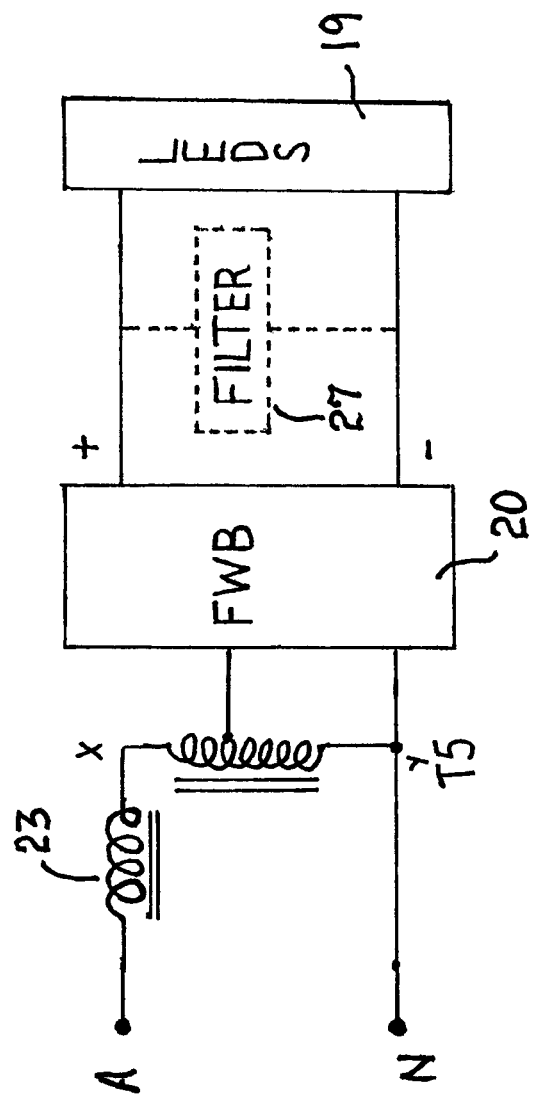
FIGS. 19 and 20 are single phase embodiments incorporating an autotransformer.
Figure 20:
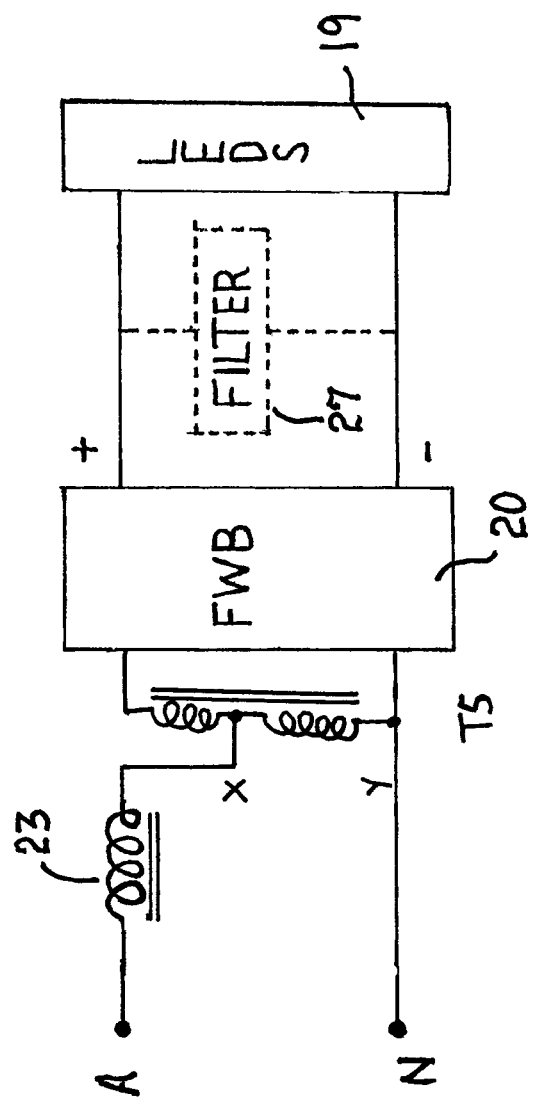

FIGS. 19 and 20 each show an arrangement with an autotransformer T5 supplying the rectifier 20 from a tapped winding. An inductor 23 is connected in series with the autotransformer T5. The tapping can be selected to enable a match between the supply voltage and the reflected load voltage X-Y (being the voltage across the LEDs 19 reflected into the mains supply circuit). In FIG. 19 the reflected LED voltage is increased. Whereas in FIG. 20 the reflected LED voltage is decreased. In both cases power factor correction can be added by connecting a capacitor across the supply terminals.

Figure 19A:
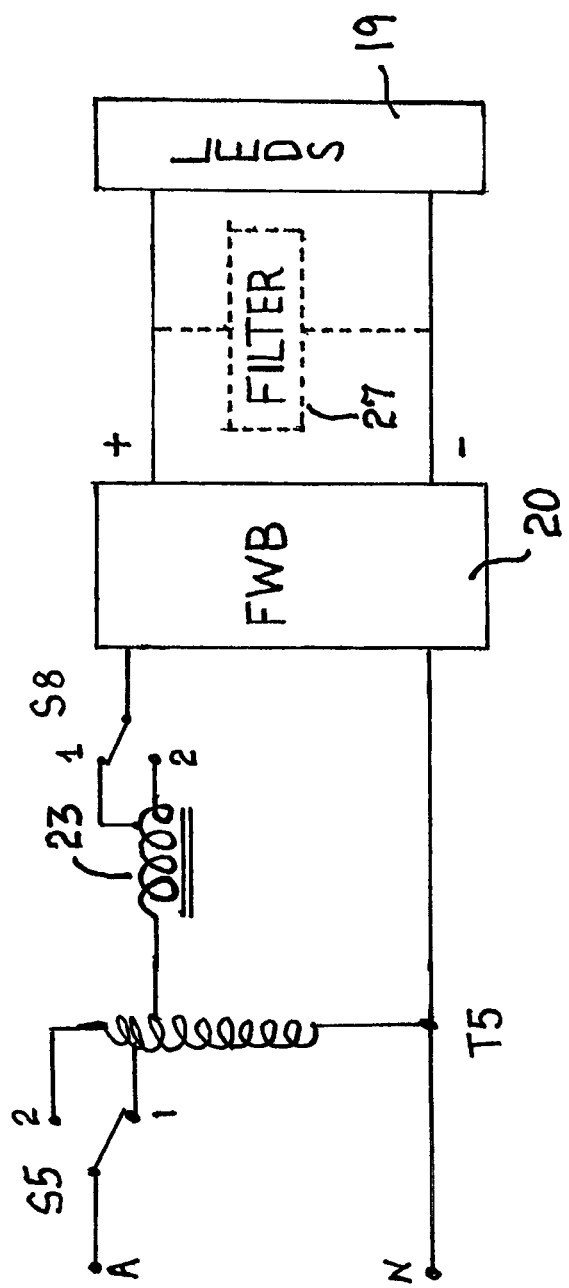
FIGS. 19A and 20A illustrate variations able to be made to the circuits of FIGS. 19 and 20, and made more generally.
Figure 20A:
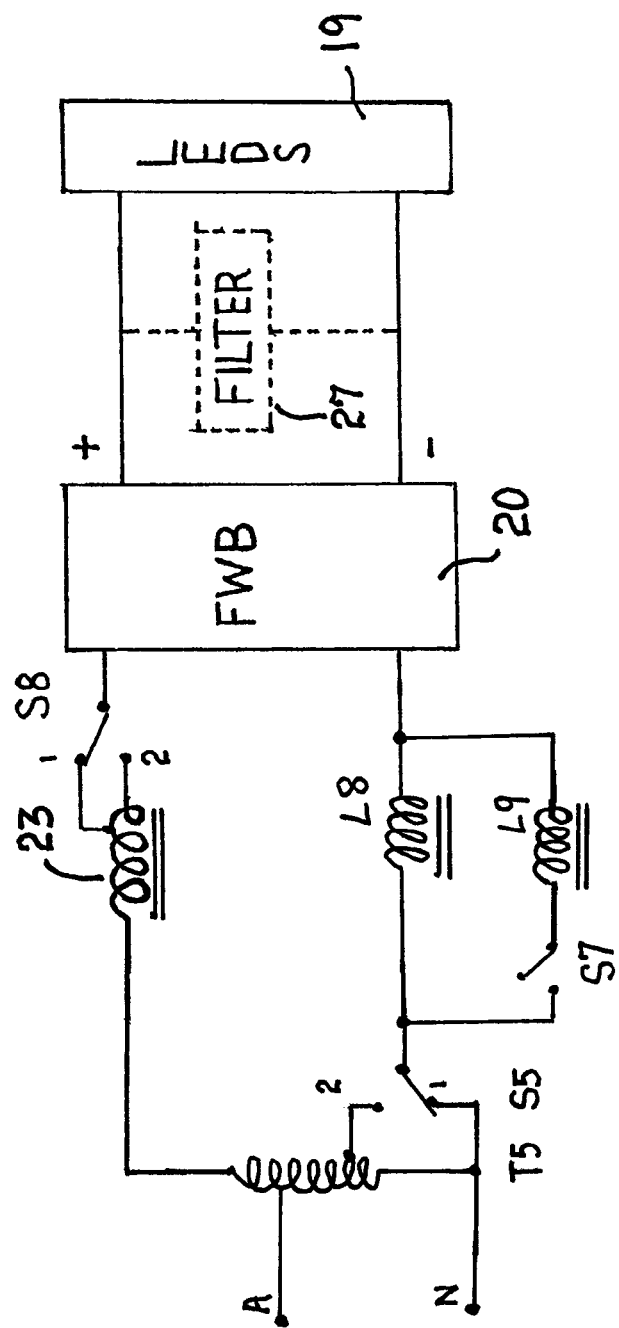

FIGS. 19A and 20A illustrate variations able to be made to the autotransformer T5 in order to dim the LEDs 19. In FIG. 19A a switch S5 is connected between some of the primary winding turns of the autotransformer T5. With the switch S5 in position 2, a lower voltage is applied to the inductor 23 and thus the LEDs 19 are dimmed. With the switch S5 in position 1, the mains voltage is applied across a small number of turns of the primary winding and thus the voltage applied to the inductor 23 and rectifier 20 is increased and thus the LEDs 19 are not dimmed.

FIG. 20A illustrates a similar arrangement but with the switch S5 connected to the secondary side of the autotransformer T5. With the switch S5 in position 1, a maximum voltage is applied to the inductor 23 and rectifier 20 and so the LEDs 19 are not dimmed. However, when the switch S5 is in position 2, a smaller voltage is applied to the inductor 23 and rectifier 20 and so the LEDs are dimmed.

It will be apparent to those skilled in the art that the above-mentioned switching on either of the primary site or the secondary side to achieve dimming is applicable to transformers other than autotransformers and thus is applicable to, for example, the transformer arrangements illustrated in FIGS. 5, 12-15 and 21-25.

Furthermore, FIGS. 19A and 20A also illustrate switched dimming techniques applicable to impedances located in the mains supply to the rectifiers 20, 200. In FIG. 19A, inductor 23 has a tapping in the winding. With switch S8 in position 1, there is a lower impedance and the LEDs 19 are not dimmed. With switch S8 in position 2, the inductor 23 has a higher impedance and the LEDs 19 are dimmed.

A similar arrangement is illustrated in FIG. 20A. In a first arrangement an inductor L8 is connected in series with the rectifier 20. A switch S7 connected in series with a further inductor L9 can be operated to connect the inductor L9 in parallel with the inductor L8, thereby increasing the current to the rectifier 20. Thus with the switch S7 open the LEDs 19 are dimmed and with the switch S7 closed, the LEDs 19 are un-dimmed.

Alternatively or additionally, the switch S8 can be provided as in FIG. 19A to change the effective number of turns of the inductor 23. With the switch S8 in position 1, the impedance of the inductor 23 is reduced, the current to the rectifier 20 is at a maximum and the LEDs 19 are un-dimmed. However, with the switch S8 in position 2, the impedance of the inductor 23 is at a maximum, and so the current to the rectifier 20 is reduced and the LEDs are dimmed. It will be apparent to those skilled in the art that in some circuit arrangements switching of capacitors can be used as an alternative form of impedance change. Other forms of switchable series and/or parallel interconnections to alter the level of current will also be apparent to those skilled in the art.

FIGS. 21-24 each illustrate a single phase circuit with an isolated high leakage transformer T10 having dual output windings. These are used to supply a pair of LED lamps 19 at an appropriate and acceptable voltage, especially in cases where a 2 wire LED voltage circuit would necessitate the use of unacceptably high voltages. Dimming can be achieved by the inclusion of additional series or parallel capacitors in the dual output windings which are switched in or out of circuit. Power factor correction can be achieved with an optional capacitor connected between the active and neutral terminals.

Figure 21:
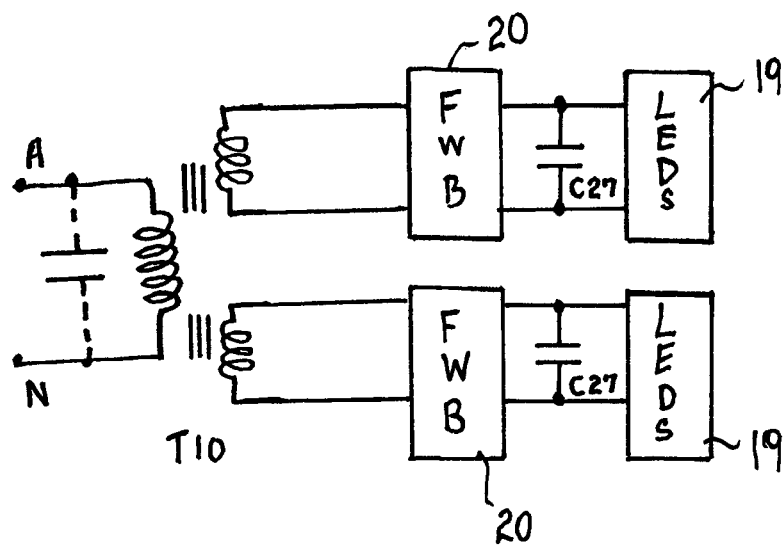
FIGS. 21-24 are single phase circuits incorporating an isolated high leakage transformer with dual output windings.
Figure 22:
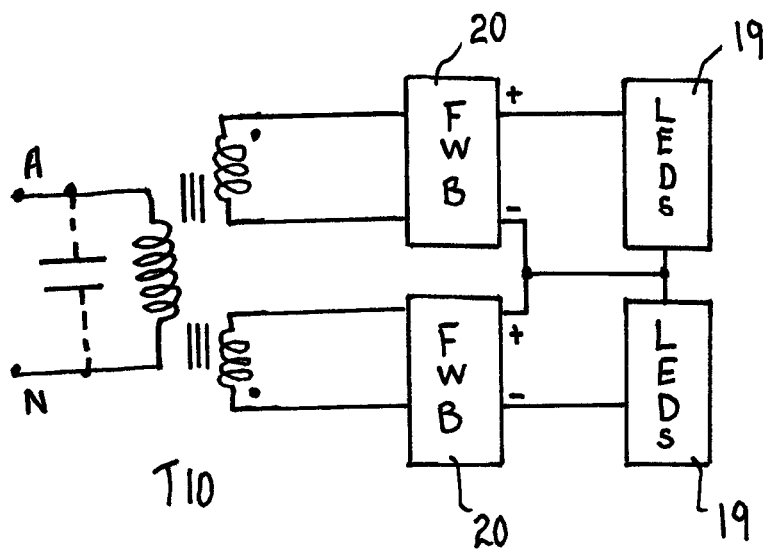
Figure 23:
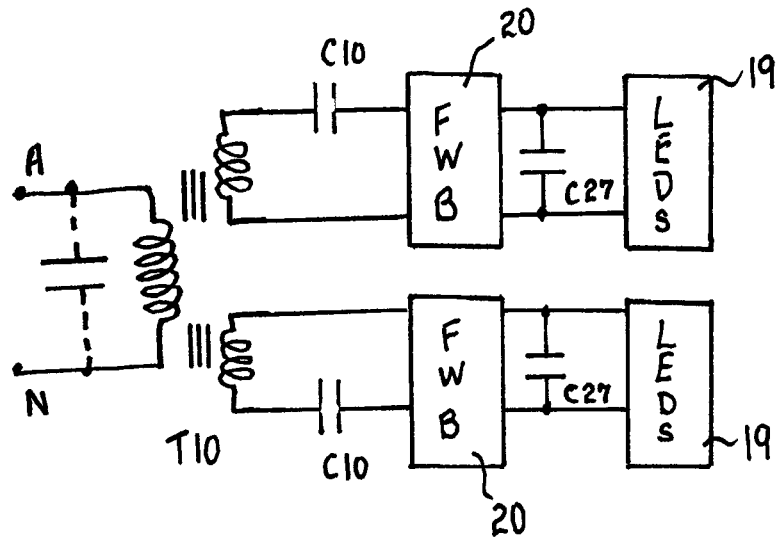

In FIGS. 21 and 23 the two full wave bridge rectifiers 20 are completely isolated from each other thus creating a 4 wire feed to the LED lamp modules 19. Alternatively, as illustrated in FIGS. 22 and 24, the two full wave bridge rectifiers 20 can have a common connection, thereby creating a 3 wire feed to the LED lamp modules 19.

Figure 24:
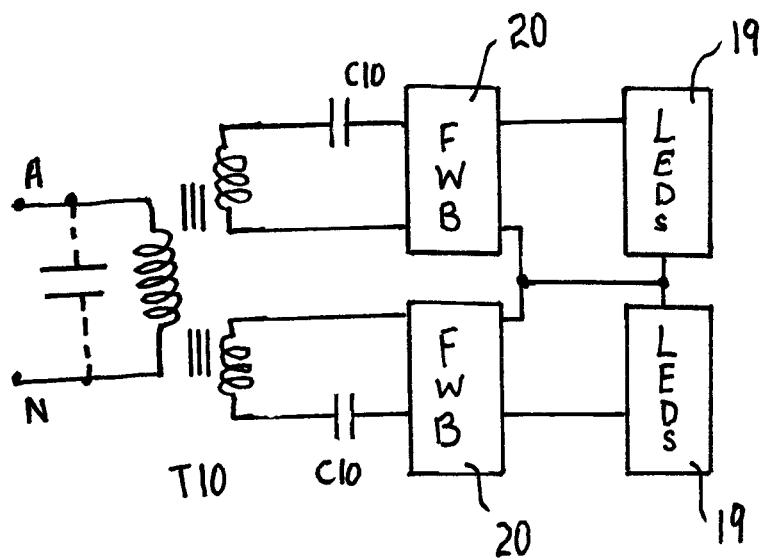

In the circuits of FIGS. 23 and 24, the dual output windings of the isolated high leakage transformer T10 each have a capacitor C10 connected in series. This arrangement provides essentially the same benefits as those associated with FIG. 5 in that the current through the LED lamp modules 19 will be relatively constant irrespective of changes in the supply voltage. However, as for the circuits of FIGS. 21 and 22, there is the additional benefit of a reduced voltage applied to the individual LED lamp modules 19.

Figure 25:
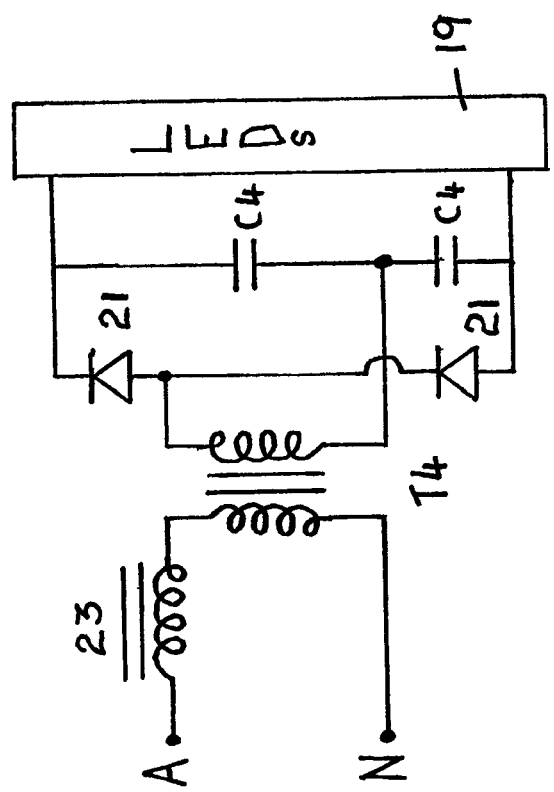
FIG. 25 is a single phase circuit incorporating a voltage doubler.

FIG. 25 illustrates a single phase circuit similar to FIG. 2 save that the rectifier 20 is replaced by a transformer T4 and voltage doubler unit formed by a pair of regular diodes 21 and a pair of capacitors C4. An advantage of the circuit of FIG. 25 is that the voltage across the LED lamp 19 is much increased and thus can accommodate an increased number of series connected LED diodes 18. Thus the lamp 19 of FIG. 25 can have an increased wattage relative to the lamps 19 of the other circuits.

The foregoing describes only some embodiments of the present invention and modifications, obvious to those skilled in LED lighting circuitry, can be made thereto without departing from the scope of the present invention. In particular, it will be appreciated that the current control is achieved in the AC portion of the circuit upstream of the rectifier supplying the LEDs. This represents a significant departure from the prior art.

Furthermore, some variations can be categorised as follows. A filter 27 can be located between the rectifier 20, 200 and the LED module(s) 19. This filter can take the form of either a shunt capacitor C27, or a series inductor, or a combination of series inductor(s) and a shunt capacitor.

In its simplest form, the control circuit is constituted by the inductor 23. However, preferably the control circuit takes the form of both the inductor 23 and a series capacitor.

In addition, the control circuit can take the form of various transformers including leakage reactance transformers, ferro-resonant transformers and constant current transformers. These can be realised by either an autotransformer or by a conventional isolation transformer. The control circuit can also take the form of a constant current transformer as illustrated in FIGS. 26 and 27.

Figure 26:
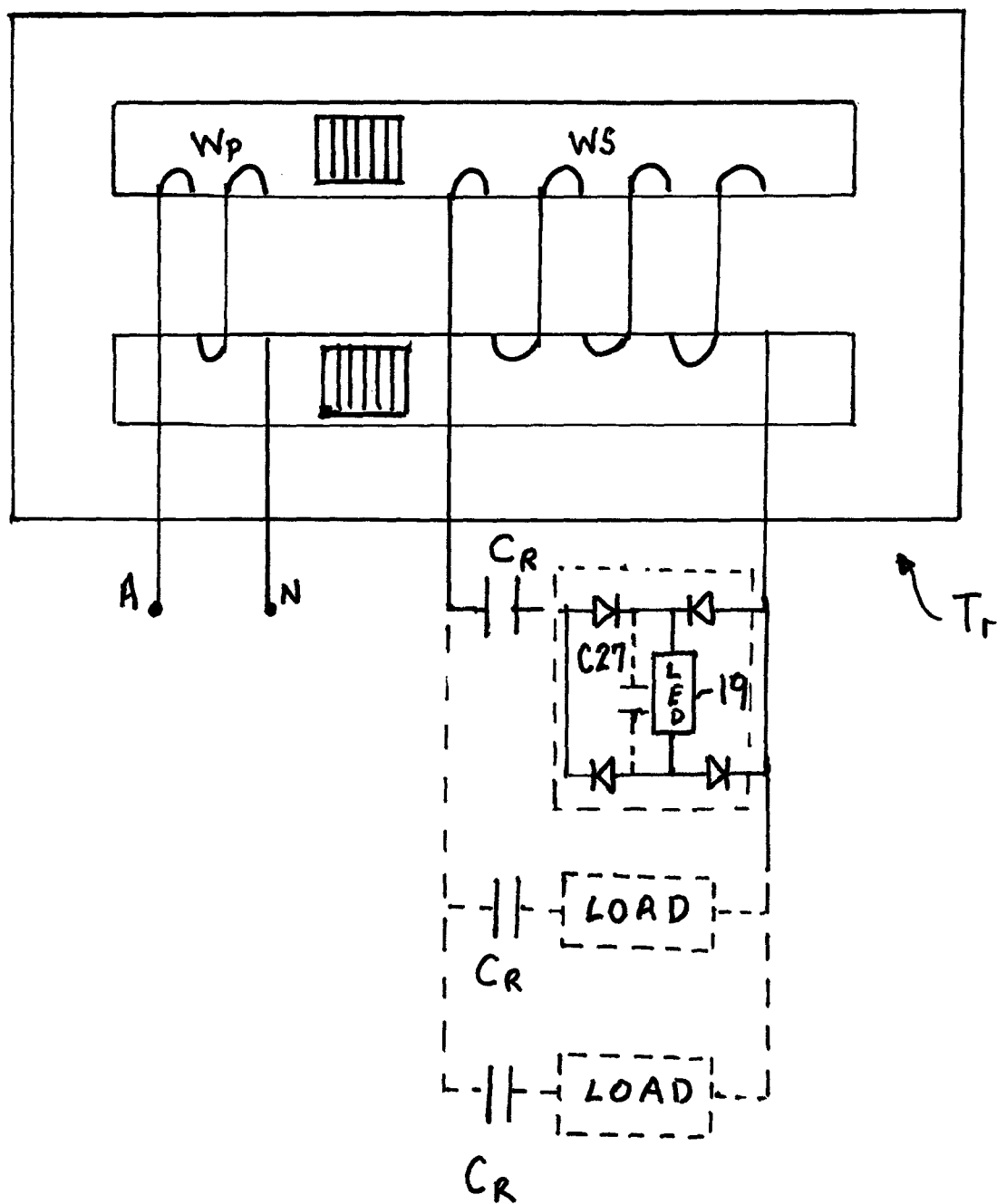
FIG. 26 is a single phase constant current transformer circuit with a single secondary winding.
Figure 27:
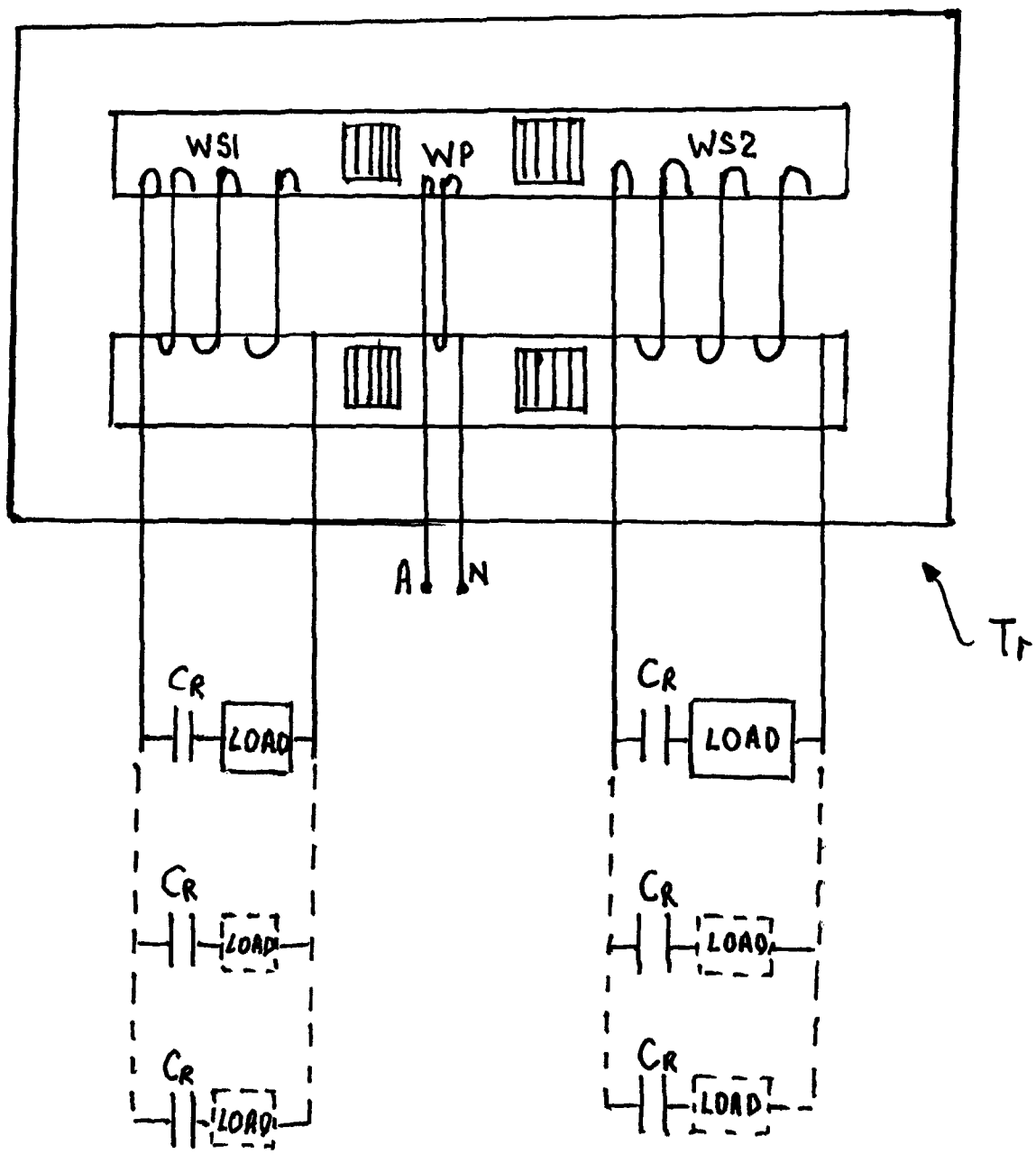
FIG. 27 is another single phase constant current transformer circuit with two secondary windings.

In FIG. 26 the constant current transformer Tr is drawn with its primary magnetic circuit illustrated with the laminations parallel to the plane of the paper and its leakage magnetic circuit drawn with the laminations perpendicular to the plane of the paper. Thus a primary winding WP is supplied with AC mains power and a secondary winding WS provides an output voltage to the load circuit(s). The shunts of the leakage magnetic circuit provides substantial leakage inductance, thereby magnetically de-coupling the output of the secondary winding from variations in the mains voltage. Preferably the magnetic circuit associated with the secondary winding WS is modified so that at least a substantial portion thereof goes into magnetic saturation during normal operation.

The non-linear nature of the inductance of the secondary winding WS in conjunction with the reactance of the resonant capacitor CR, result in at least a portion of the secondary winding magnetic circuit being maintained in a magnetically saturated state due to resonance.

Since the magnetic core associated with the secondary winding WS is saturated, so changes in the mains voltage have virtually no effect on the output of the secondary winding WS, with the result that its voltage remains constant. This has the consequence that the current through the load also remains constant and its magnitude is primarily governed by the size of the resonant capacitor CR.

Preferably as indicated in FIG. 26, the load consists of 4 regular diodes forming a full wave bridge rectifier with the LEDs module 19 forming the load. If desired, an optional filtering capacitor C27 can be connected in parallel with the LEDs 19.

In addition to controlling the load current so as to be substantially constant, there are other benefits to this circuit. One such benefit is the very high operating power factor, which is very close to unity. Another benefit is the very low total harmonic distortion in the mains circuit, typically being less than 10% distortion. A further benefit is that the secondary circuit has a very high immunity to transient voltages in the mains supply, and this immunity is applicable to both transverse mode transient voltages and common mode transient voltages.

If a further improvement in line regulation is required, then a small bucking winding (not illustrated but conventional) can be wound over the primary winding WP and connected in series with the secondary winding WS but in an inductively opposing sense.

As indicated by broken lines in FIG. 26, multiple load circuits each with its own string of LEDs 19 can be operated in parallel with the one constant current transformer Tr. The extension to 3 phases is as indicated in FIGS. 12-15.

Turning now to FIG. 27, it is possible to build a constant current transformer Tr having a single primary winding WP and two totally independent secondary windings WS1 and WS2. The single primary winding WP is located in between a pair of magnetic shunts and results in substantial saturation of the magnetic circuit of each of the secondary windings WS1 and WS2. Each of the secondary windings is capable of supplying a number of parallel load circuits in the manner of FIG. 26.

In general, the AC mains supply can be either single phase or poly phase (normally three-phases). Where a transformer is used for three-phase arrangement, the primary windings of the transformer can be connected either in Wye configuration or in Delta configuration. A power factor correction circuit can be used to improve the power factor of the overall circuit. A typical power factor correction circuit is a shunt capacitor connected between the phases of the supply or between each phase and a star point or neutral connection.

Power factor correction can also be implemented by duplicating the overall circuit and operating two sets of LED modules 19 in a lead-lag configuration.

Dimming is possible by switching off one of the duplicate circuits in a lead-lag configuration, or switching off one or more of the phases of a poly phase circuit. Dimming is also possible by switching impedance(s) into and out of the supply circuit to the rectifier 20, 200. Similarly, dimming is also possible by switching turns into and out of transformer arrangements applying the rectifier 20, 200.

For a poly phase circuit, such as a three-phase circuit, a 3 wire supply or 4 wire supply is possible. The 3 wire supply can be delta connected, or have a floating star point. The 4 wire supply can have the star point connected to a neutral terminal.

The foregoing describes only some embodiments of the present invention and modifications, obvious to those skilled in the electronic arts, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A control circuit for supplying a substantially constant DC current to a LED lamp unit which constitutes a load, said circuit comprising AC inputs for connection to an AC supply which is subject to variations including supply voltage fluctuations and transients, a pair of lamp outputs for connection to said LED lamp unit, and a full wave rectifying circuit supplying a DC voltage and said substantially constant DC current to said lamp outputs, wherein an AC control circuit is interposed between said AC inputs and said rectifying circuit to reduce variations in the magnitude of an AC current supplied to said rectifying circuit from said AC control circuit to thereby reduce corresponding variations in said substantially constant DC current, said AC control circuit includes a capacitor and an inductive winding of a magnetic component comprising a non-linear inductance and having a magnetically permeable core that at least part of which in operation is at least partially saturated by ferro-resonance, wherein said capacitor, said rectifying circuit and said LED lamp unit are electrically connected in series to conduct a load current, said load current is controlled by said inductive winding, and said ferro-resonance being at least in part created by said load current.

2. The control circuit as claimed in claim 1 wherein said capacitor comprises both a resonant reactance for said ferro-resonance and a current limiting impedance for said substantially constant DC current.

3. The control circuit as claimed in claim 1 wherein a filter circuit is connected to the output of said rectifying circuit.

4. The control circuit as claimed in claim 3 wherein said filter circuit comprises a shunt capacitor.

5. The control circuit as claimed in claim 1 wherein said magnetic component comprises an inductor, an autotransformer, or an isolation transformer.

6. The control circuit as claimed in claim 1 wherein LED dimming is achieved by switching turns into, or out of, a winding of said magnetic component.

7. The control circuit as claimed in claim 1 wherein said AC supply comprises a three-phase supply.

8. The control circuit as claimed in claim 7 and including at least one dimming switch which disables a corresponding phase of said three-phase supply.

9. The control circuit as claimed in claim 1 and including at least one dimming switch which switches one or more impedances into or out of said AC control circuit.

10. The control circuit as claimed in claim 9 wherein said impedances are selected from the class consisting of inductors and capacitors.

11. The control circuit as claimed in claim 9 wherein said switched impedances are in series, or in parallel, with said capacitor.

12. The control circuit as claimed in claim 1 and including a power factor correction circuit.

13. The control circuit as claimed in claim 1 wherein said rectifying circuit is a full wave bridge rectifying circuit.

14. A lighting installation comprising an LED lamp fixture constituting a load supplied with a substantially constant DC current by a full wave rectifying circuit, said rectifying circuit being supplied by an AC supply which is subject to variations including supply voltage fluctuations and transients, and an AC control circuit interposed between said rectifying circuit and said AC supply to reduce variations in the magnitude of an AC current supplied to said rectifying circuit from said AC control circuit to thereby reduce corresponding variations in said substantially constant DC current, said AC control circuit includes a capacitor and an inductive winding of a magnetic component comprising a non-linear inductance and having a magnetically permeable core that at least part of which in operation is at least partially saturated by ferro-resonance, wherein said capacitor, said rectifying circuit and said LED lamp unit are electrically connected in series to conduct a load current, said load current is controlled by said inductive winding, and said ferro-resonance being at least in part created by said load current.

15. The lighting installation as claimed in claim 14 wherein said capacitor comprises both a resonant reactance for said ferro-resonance and a current limiting impedance for said substantially constant DC current.

16. The lighting installation as claimed in claim 14 wherein a filter circuit is connected to the output of said rectifying circuit.

17. The lighting installation as claimed in claim 16 wherein said filter circuit comprises a shunt capacitor.

18. The lighting installation as claimed in claim 14 wherein said magnetic component comprises an inductor, an autotransformer, or an isolation transformer.

19. The lighting installation as claimed in claim 14 wherein LED dimming is achieved by switching turns into, or out of, a winding of said magnetic component.

20. The lighting installation as claimed in claim 14 wherein said AC supply comprises a three-phase supply.

21. The lighting installation as claimed in claim 20 and including at least one dimming switch which disables a corresponding phase of said three-phase supply.

22. The lighting installation as claimed in claim 14 and including at least one dimming switch which switches one or more impedances into or out of said AC control circuit.

23. The lighting installation as claimed in claim 22 wherein said impedances are selected from the class consisting of inductors and capacitors.

24. The lighting installation as claimed in claim 22 wherein said switched impedances are in series, or in parallel, with said capacitor.

25. The lighting installation as claimed in claim 14 and including a power factor correction circuit.

26. The lighting installation as claimed in claim 14 wherein said rectifying circuit is a full wave bridge rectifying circuit.

27. A method of converting a High Intensity Discharge (HID) lamp installation supplied by an AC supply subject to variations including supply voltage variations and transients, and including a HID lamp fitting, a ballast and associated control gear, to a LED lamp installation including a LED lamp fitting supplied with a substantially constant DC current, said method comprising the steps of:
  replacing said HID lamp fitting with said LED lamp fitting,
  replacing said ballast and associated control gear with a rectifying circuit having an input and an output,
  connecting the output of said rectifying circuit to said LED lamp fitting as a load, and
  interposing an AC control circuit between said AC supply and said rectifying circuit input to reduce variations in the magnitude of an AC current supplied to said rectifying circuit from said AC control circuit to thereby reduce corresponding variations in said substantially constant DC current, said AC control circuit including a capacitor and an inductive winding of a magnetic component comprising a non-linear inductance and having a magnetically permeable core that at least part of which in operation is at least partially saturated by ferro-resonance, wherein said capacitor, said rectifying circuit and said LED lamp unit are electrically connected in series to conduct a load current, said load current is controlled by said inductive winding, and said ferro-resonance being at least in part created by said load current.

28. The method as claimed in claim 27 wherein said capacitor comprises both a resonant reactance for said ferro-resonance and a current limiting impedance for said substantially constant DC current.

29. The method as claimed in claim 27 wherein a filter circuit is connected to the output of said rectifying circuit.

30. The method as claimed in claim 29 wherein said filter circuit comprises a shunt capacitor.

31. The method as claimed in claim 27 wherein said magnetic component comprises an inductor, an autotransformer, or an isolation transformer.

32. The method as claimed in claim 27 wherein LED dimming is achieved by switching turns into, or out of, a winding of said magnetic component.

33. The method as claimed in claim 27 wherein said AC supply comprises a three-phase supply.

34. The method as claimed in claim 33 and including at least one dimming switch which disables a corresponding phase of said three-phase supply.

35. The method as claimed in claim 27 and including at least one dimming switch which switches one or more impedances into or out of said AC control circuit.

36. The method as claimed in claim 35 wherein said impedances are selected from the class consisting of inductors and capacitors.

37. The method as claimed in claim 35 wherein said switched impedances are in series, or in parallel, with said capacitor.

38. The method as claimed in claim 27 and including a power factor correction circuit.

39. The method as claimed in claim 27 wherein said rectifying circuit is a full wave bridge rectifying circuit.

* * * * *